(12) United States Patent
Barnett et al.

(10) Patent No.: US 10,311,421 B2
(45) Date of Patent: Jun. 4, 2019

(54) SYSTEMS AND METHODS FOR MANAGING A PAYMENT TERMINAL VIA A WEB BROWSER

(71) Applicant: Bluefin Payment Systems LLC, Atlanta, GA (US)

(72) Inventors: Timothy William Barnett, Roswell, GA (US); Donal McCarthy, Waterford (IE)

(73) Assignee: BLUEFIN PAYMENT SYSTEMS LLC, Atlanta, GA (US)

( * ) Notice: Subject to any disclaimer, the term of this patent is extended or adjusted under 35 U.S.C. 154(b) by 0 days.

(21) Appl. No.: 15/997,269

(22) Filed: Jun. 4, 2018

(65) Prior Publication Data

US 2018/0349875 A1    Dec. 6, 2018

Related U.S. Application Data

(60) Provisional application No. 62/514,308, filed on Jun. 2, 2017.

(51) Int. Cl.
*G06Q 20/20*        (2012.01)
*H04L 29/08*        (2006.01)
(Continued)

(52) U.S. Cl.
CPC ....... *G06Q 20/202* (2013.01); *H04L 61/2015* (2013.01); *H04L 61/304* (2013.01);
(Continued)

(58) Field of Classification Search
CPC .................. G05B 15/02; G05B 19/042; G05B 2219/2642; G05B 2219/33221;
(Continued)

(56) References Cited

U.S. PATENT DOCUMENTS

| 4,926,475 A | 5/1990 | Spiotta et al. |
| 6,286,099 B1 | 9/2001 | Kramer |
| (Continued) | | |

FOREIGN PATENT DOCUMENTS

| CN | 102387501 A | 3/2012 |
| EP | 1482404 A2 | 12/2004 |
| (Continued) | | |

OTHER PUBLICATIONS

TechopediA, "What is a DNS Lookup," https://techopedia.conn/definition/29029/dns-lookup[Mar. 11, 2019 2:32:09 PM] (Year: 2019).*

(Continued)

*Primary Examiner* — Jacob C. Coppola
(74) *Attorney, Agent, or Firm* — Morris, Manning & Martin, LLP; Bryan D. Stewart; Joseph A. Wallace, Jr.

(57) ABSTRACT

The present disclosure relates generally to communication with payment terminals via TCP/IP protocol. Using network technology and novel processes, in particular embodiments, the present systems and methods facilitate local network discovery and communication between a payment terminal and an electronic cash register ("ECR") via a browser. For example, in certain embodiments, the present systems and methods leverage TCP/IP network technology to securely facilitate communications between SaaS ECR software running in a browser environment and one or more payment terminals.

10 Claims, 13 Drawing Sheets

EXEMPLARY CUSTOM DNS SERVICE PROCESS

(51) Int. Cl.
*H04L 29/06* (2006.01)
*H04L 29/12* (2006.01)

(52) U.S. Cl.
CPC ............ *H04L 67/12* (2013.01); *H04L 69/169* (2013.01); *H04L 61/1511* (2013.01)

(58) Field of Classification Search
CPC ..... H04L 9/0825; H04L 9/083; H04L 9/0838; H04L 9/085; H04L 9/0897; H04L 9/30; H04L 61/1511; H04L 67/12; H04L 69/169; G06Q 20/10; G06Q 30/04; G06Q 10/02; G06Q 20/29; G06Q 20/36; G06Q 20/3829; G06Q 20/389; G06Q 20/202; G06Q 20/08
See application file for complete search history.

(56) References Cited

U.S. PATENT DOCUMENTS

| | | | |
|---|---|---|---|
| 6,446,092 | B1 | 9/2002 | Sutter |
| 6,484,260 | B1 | 11/2002 | Scott et al. |
| 6,523,032 | B1 | 2/2003 | Sunkara |
| 6,934,664 | B1 | 8/2005 | Webb et al. |
| 7,028,014 | B1 | 4/2006 | Naclerio |
| 7,386,471 | B1 | 6/2008 | Nack |
| 7,546,465 | B2 | 6/2009 | Kent, Jr. et al. |
| 7,731,435 | B2 | 6/2010 | Piersol et al. |
| 7,941,673 | B1 | 5/2011 | Trimberger |
| 8,315,948 | B2 | 11/2012 | Walker et al. |
| 8,429,041 | B2 | 4/2013 | Bonalle et al. |
| 8,555,083 | B1 | 10/2013 | Nanda et al. |
| 8,788,428 | B2 | 7/2014 | Weston et al. |
| 9,355,374 | B2 | 5/2016 | Barnett et al. |
| 9,419,842 | B1 | 8/2016 | Galliher, III et al. |
| 9,953,316 | B2 | 4/2018 | Barnett et al. |
| 2002/0082896 | A1 | 6/2002 | Inagi |
| 2003/0035569 | A1 | 2/2003 | Chau |
| 2003/0051150 | A1 | 3/2003 | Jung |
| 2004/0247126 | A1 | 12/2004 | McClellan |
| 2005/0108517 | A1* | 5/2005 | Dillon ............... G06F 17/30902 713/150 |
| 2005/0166082 | A1 | 7/2005 | Williams et al. |
| 2006/0049255 | A1 | 3/2006 | Von Meuller et al. |
| 2007/0005974 | A1 | 1/2007 | Kudou |
| 2007/0067297 | A1 | 3/2007 | Kublickis |
| 2007/0101123 | A1 | 5/2007 | Kollmyer et al. |
| 2007/0246529 | A1 | 10/2007 | Lalo et al. |
| 2008/0049644 | A1 | 2/2008 | Halbert |
| 2008/0080713 | A1 | 4/2008 | Cho et al. |
| 2008/0109372 | A1 | 5/2008 | Bykov et al. |
| 2008/0201778 | A1 | 8/2008 | Guo et al. |
| 2008/0320297 | A1 | 12/2008 | Sabo et al. |
| 2008/0320317 | A1 | 12/2008 | Funahashi et al. |
| 2009/0048971 | A1 | 2/2009 | Hathaway et al. |
| 2009/0126017 | A1 | 5/2009 | Chahal |
| 2009/0327421 | A1 | 12/2009 | Fu et al. |
| 2010/0094755 | A1 | 4/2010 | Kloster |
| 2010/0107230 | A1 | 4/2010 | Tyagi et al. |
| 2010/0174626 | A1 | 7/2010 | Stringfellow et al. |
| 2010/0306635 | A1 | 12/2010 | Tang et al. |
| 2010/0325710 | A1 | 12/2010 | Etchegoyen |
| 2010/0325734 | A1 | 12/2010 | Etchegoyen |
| 2010/0332396 | A1 | 12/2010 | Etchegoyen |
| 2010/0332400 | A1 | 12/2010 | Etchegoyen |
| 2011/0035294 | A1 | 2/2011 | Mizrah |
| 2011/0082798 | A1 | 4/2011 | Michaud et al. |
| 2011/0093503 | A1 | 4/2011 | Etchegoyen |
| 2011/0093703 | A1 | 4/2011 | Etchegoyen |
| 2011/0179271 | A1 | 7/2011 | Orsini et al. |
| 2011/0196754 | A1 | 8/2011 | Proud et al. |
| 2011/0258272 | A1* | 10/2011 | Drako ................ G06Q 10/107 709/206 |
| 2011/0307710 | A1 | 12/2011 | McGuire et al. |
| 2012/0030209 | A1 | 2/2012 | Bause et al. |
| 2012/0054050 | A1 | 3/2012 | Ziegler et al. |
| 2012/0054493 | A1 | 3/2012 | Bradley |
| 2012/0084206 | A1 | 4/2012 | Mehew et al. |
| 2012/0150742 | A1 | 6/2012 | Poon et al. |
| 2012/0210421 | A1 | 8/2012 | Ormazabal et al. |
| 2012/0255034 | A1 | 10/2012 | Orsini et al. |
| 2012/0278335 | A1* | 11/2012 | Bentkofsky ........... G06F 16/285 707/743 |
| 2012/0324242 | A1 | 12/2012 | Kirsch |
| 2013/0036098 | A1 | 2/2013 | Mutalik et al. |
| 2013/0097081 | A1 | 4/2013 | Leavitt et al. |
| 2013/0160038 | A1 | 6/2013 | Slaney et al. |
| 2013/0191887 | A1 | 7/2013 | Davis et al. |
| 2013/0225213 | A1 | 8/2013 | Antypas, III |
| 2013/0242795 | A1 | 9/2013 | Heen et al. |
| 2013/0254117 | A1 | 9/2013 | Von Mueller et al. |
| 2013/0297579 | A1 | 11/2013 | Andrew et al. |
| 2013/0311434 | A1 | 11/2013 | Jones |
| 2013/0346302 | A1 | 12/2013 | Purves et al. |
| 2014/0013452 | A1 | 1/2014 | Aissi et al. |
| 2014/0025948 | A1 | 1/2014 | Bestler et al. |
| 2014/0052553 | A1 | 2/2014 | Uzo |
| 2014/0072188 | A1 | 3/2014 | Liu et al. |
| 2014/0173686 | A1 | 6/2014 | Kgil et al. |
| 2014/0197234 | A1 | 7/2014 | Hammad |
| 2014/0344921 | A1 | 11/2014 | Hamlin et al. |
| 2015/0150110 | A1 | 5/2015 | Canning et al. |
| 2015/0178819 | A1 | 6/2015 | Kassemi et al. |
| 2015/0199682 | A1 | 7/2015 | Kalgi et al. |
| 2015/0220635 | A1 | 8/2015 | Deen et al. |
| 2015/0220636 | A1 | 8/2015 | Deen et al. |
| 2015/0221336 | A1 | 8/2015 | Deen et al. |
| 2015/0271150 | A1 | 9/2015 | Barnett et al. |
| 2015/0381582 | A1 | 12/2015 | O'Hare et al. |
| 2016/0189126 | A1 | 6/2016 | Cheng et al. |
| 2016/0219024 | A1 | 7/2016 | Verzun et al. |
| 2016/0241528 | A1* | 8/2016 | Kulkarni ............. H04L 67/2842 |
| 2017/0017939 | A1 | 1/2017 | Killoran, Jr. et al. |
| 2017/0032361 | A1 | 2/2017 | Purves et al. |
| 2017/0063798 | A1* | 3/2017 | Lapidous ............ H04L 63/0281 |
| 2017/0104731 | A1 | 4/2017 | Baudoin et al. |
| 2017/0200150 | A1 | 7/2017 | Cohn et al. |
| 2017/0300918 | A1* | 10/2017 | Bernstein ............. G06Q 20/385 |
| 2017/0310709 | A1* | 10/2017 | Foxhoven ............... H04L 63/20 |
| 2018/0198607 | A1 | 7/2018 | Punekar et al. |
| 2018/0349875 | A1* | 12/2018 | Barnett ................ G06Q 20/202 |

FOREIGN PATENT DOCUMENTS

| | | |
|---|---|---|
| JP | 2013545411 | 12/2013 |
| KR | 20090039301 A | 4/2009 |

OTHER PUBLICATIONS

International Search Report and Written Opinion dated Aug. 31, 2018 in International Patent Application No. PCT/US18/35850.
International Search Report and Written Opinion dated Aug. 23, 2018 in International Patent Application No. PCT/US18/35858.
International Search Report and Written Opinion dated Apr. 13, 2015 for related PCT application No. PCT/US2015/10405.
International Search Report and Written Opinion dated Sep. 4, 2015 for related PCT application No. PCT/US2015/21595.
Common Approval Scheme, Point of Interaction Protection Profile, Nov. 26, 2010 Version: 2.0, 161 pages.
Security Standards Council, Payment Card Industry (PCI) PIN Transaction Security (PTS) Point of Interaction (POI), Modular Security Requirements, Version 4.0 Jun. 2013, 59 pages.
European Search Report dated Jul. 19, 2017 in related European Patent Application No. 15765006.
European Search Report and European Search Opinion dated Oct. 13, 2017 in related European patent application No. 15765781.8.
Matt, Susan: "P2P Encryption", Jun. 23, 2011 (Jun. 23, 2011). XP055412989. Retrieved from the Internet: URL: http://www.elementps.com/Portals/0/P2P-Encryption-White-Paper.pdf.
First Data: "EMV and Encryption+Tokenization: A Layered Approach to Security" Jun. 1, 2012 (Jun. 1, 2012). XP055413104. Retrieved

(56) References Cited

OTHER PUBLICATIONS from the Internet: URL: https://www.firstdata.com/downloads/thought-leadership/EMV-Encrypt-TokenizationWP.pdf.
International Search Report and Written Opinion dated Jan. 22, 2019 in related international patent application No. PCT/US18/55690.

* cited by examiner

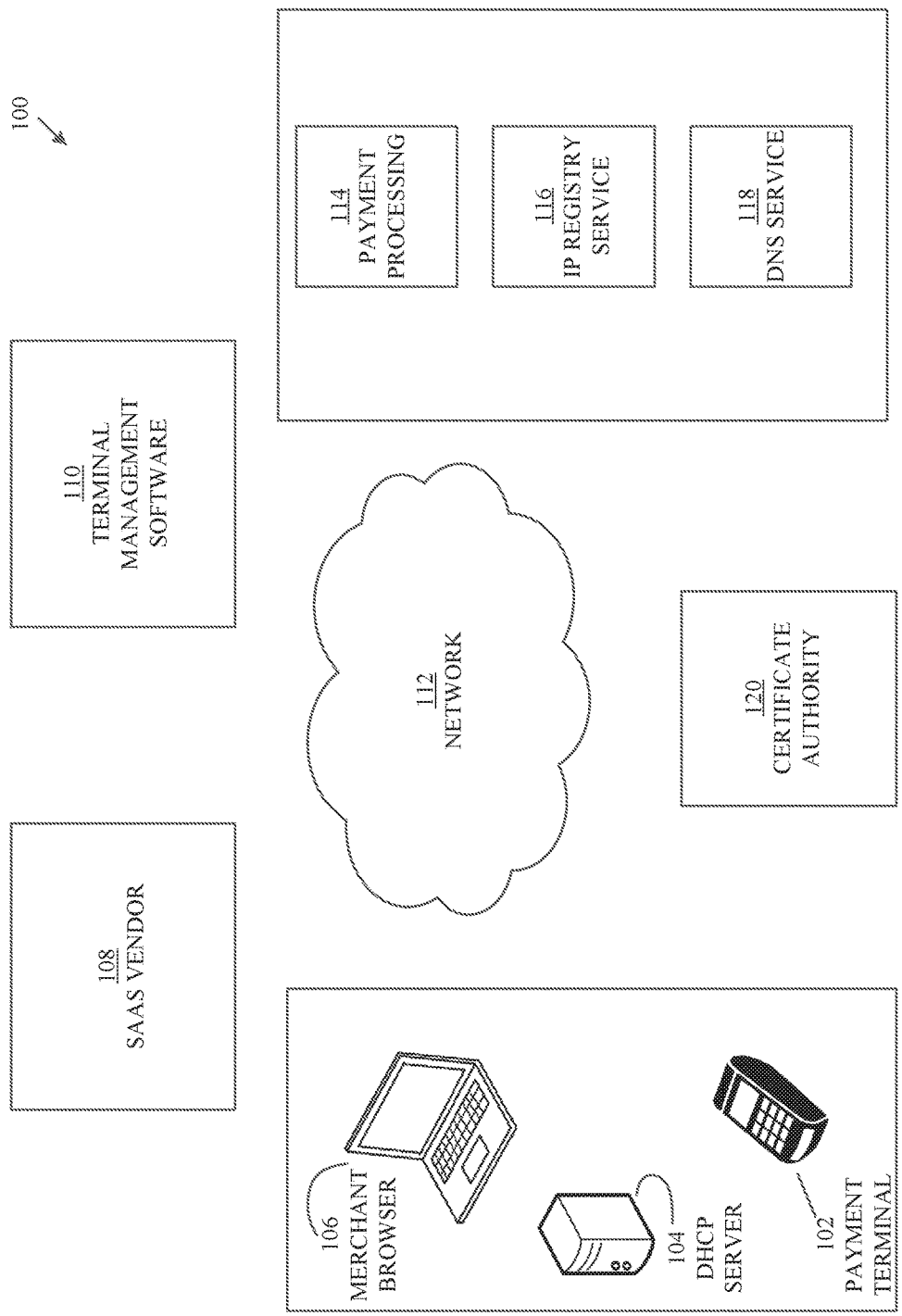
FIG. 1A: EXEMPLARY SYSTEM ENVIRONMENT

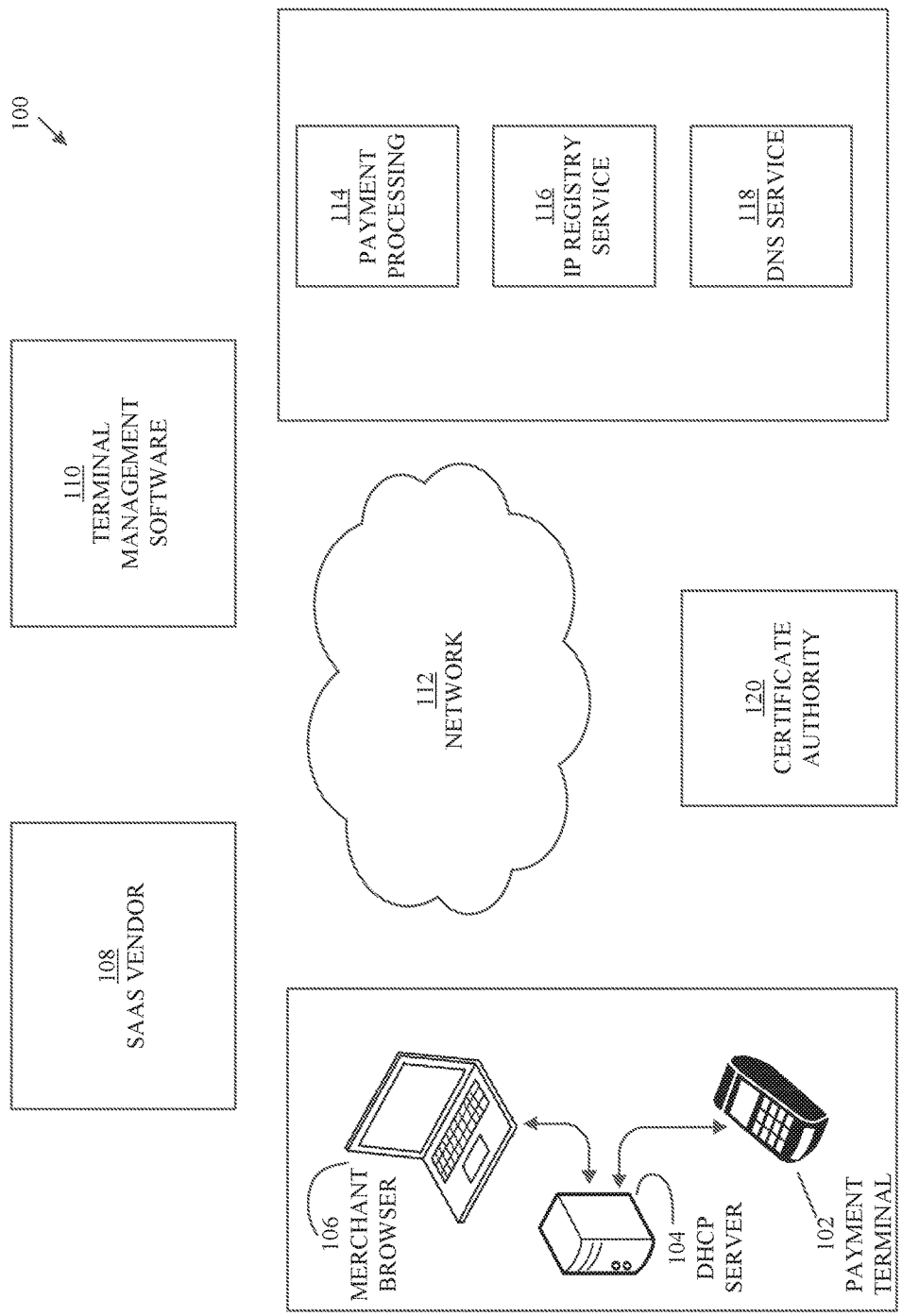
FIG. 1B: EXEMPLARY SYSTEM ENVIRONMENT

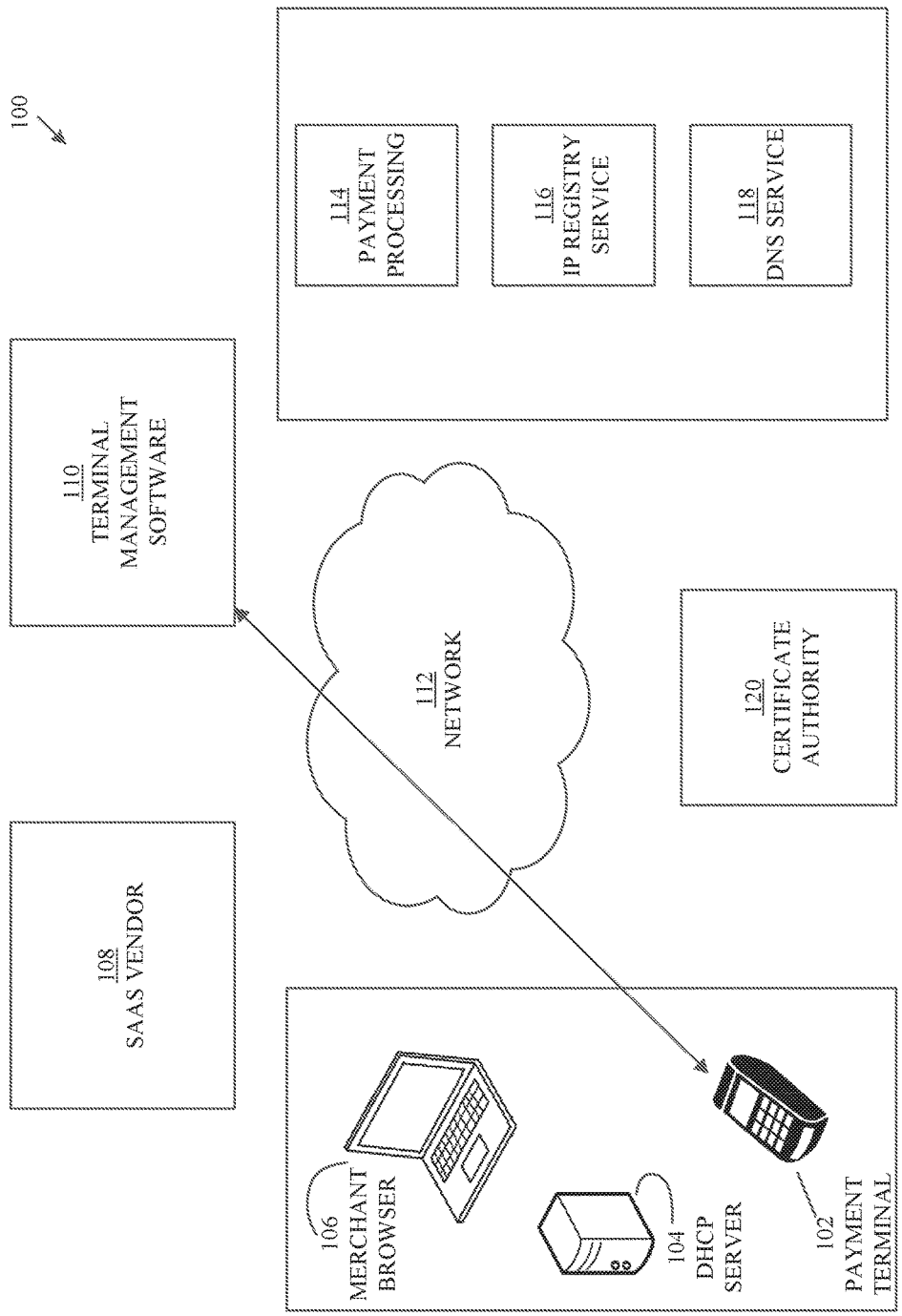
FIG. 1C: EXEMPLARY SYSTEM ENVIRONMENT

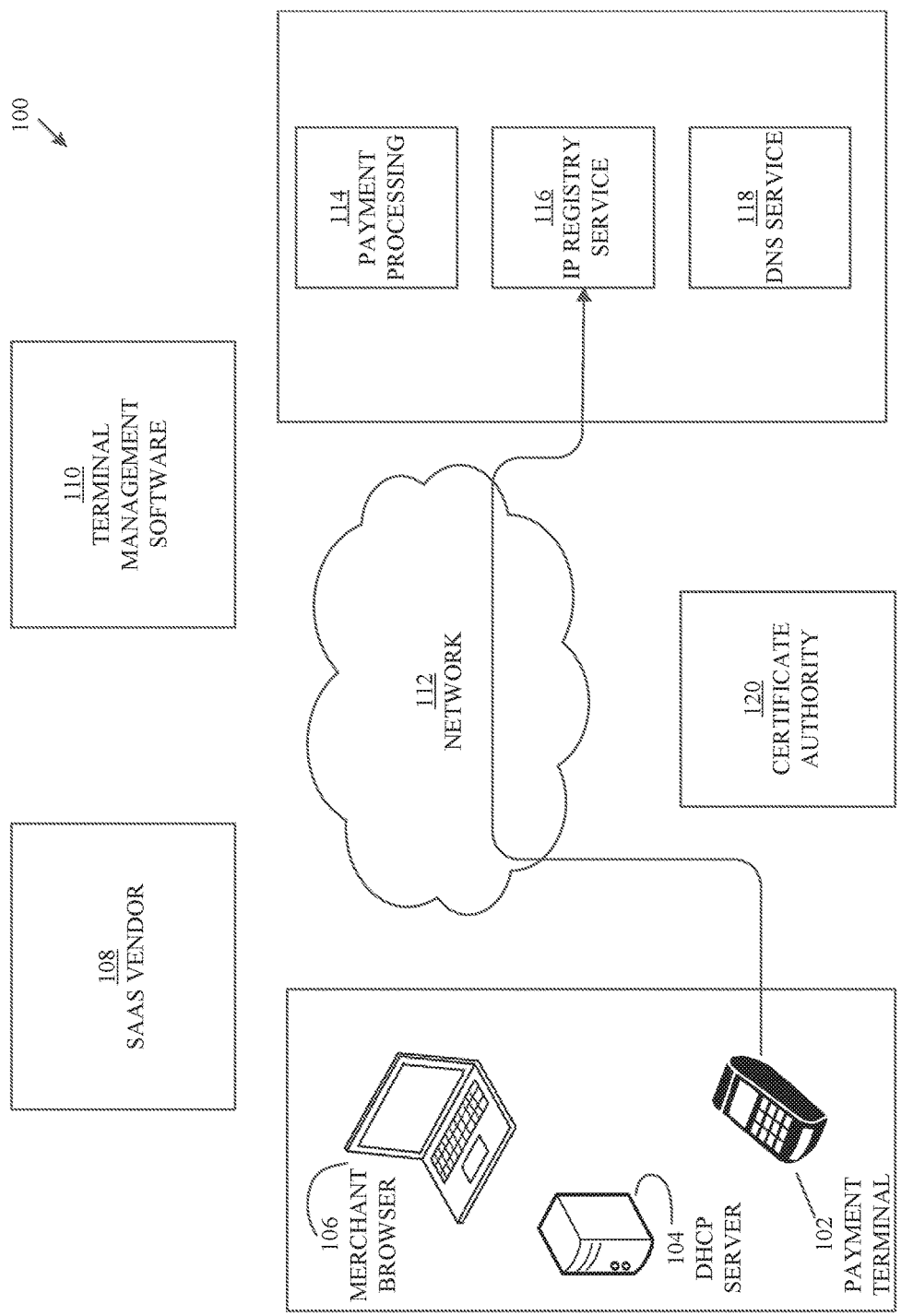
FIG. 1D: EXEMPLARY SYSTEM ENVIRONMENT

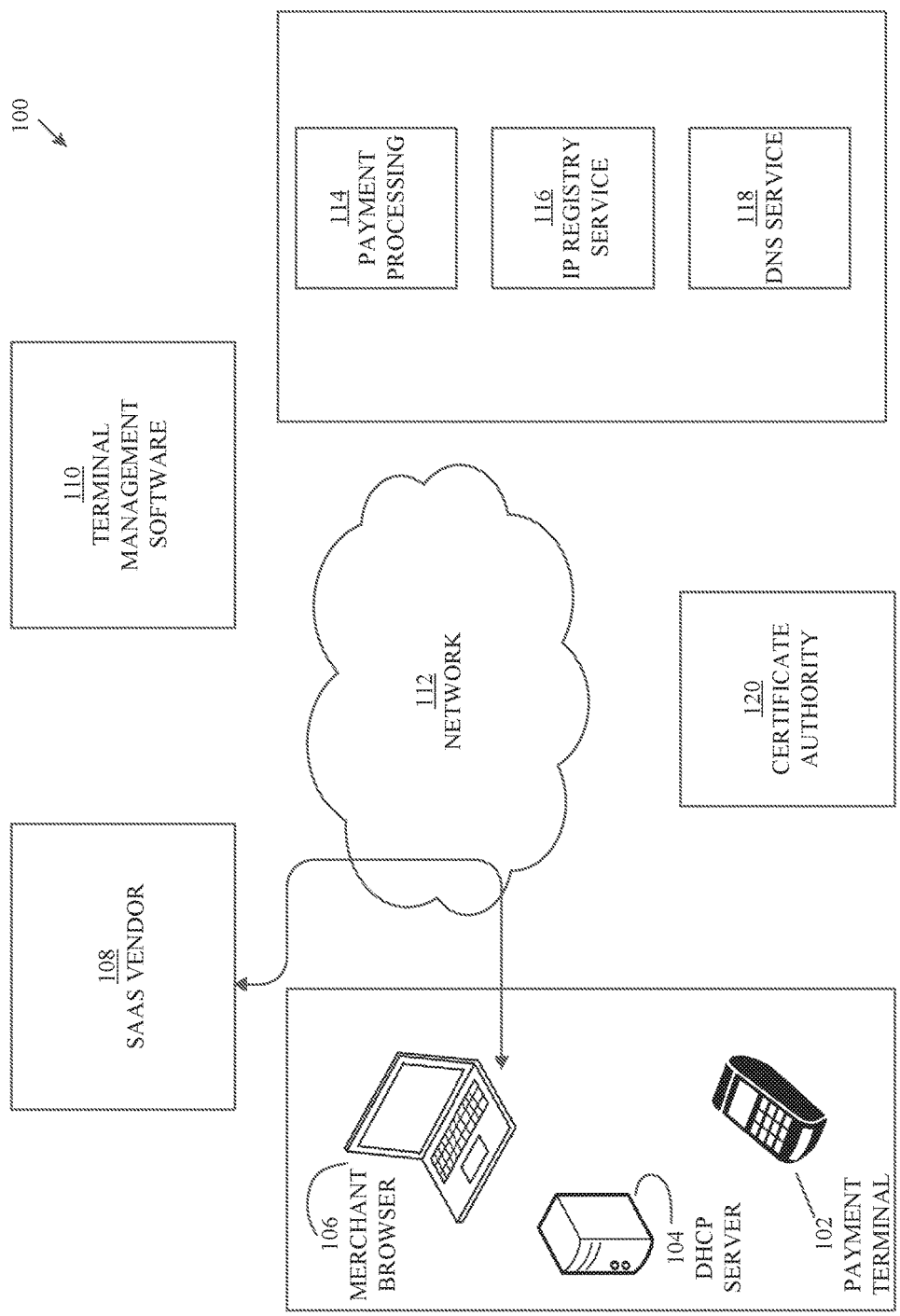
FIG. 1E: EXEMPLARY SYSTEM ENVIRONMENT

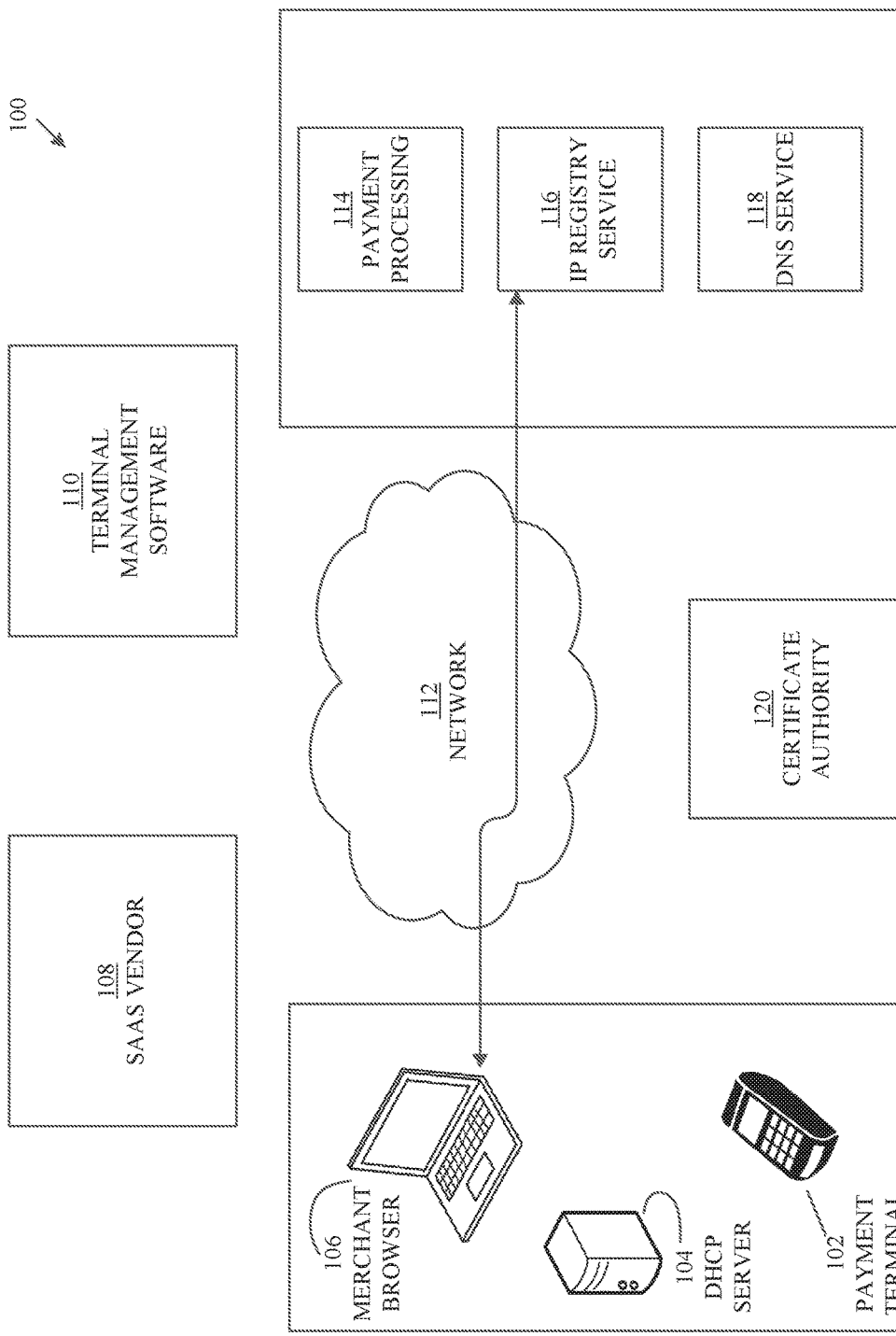
FIG. 1F: EXEMPLARY SYSTEM ENVIRONMENT

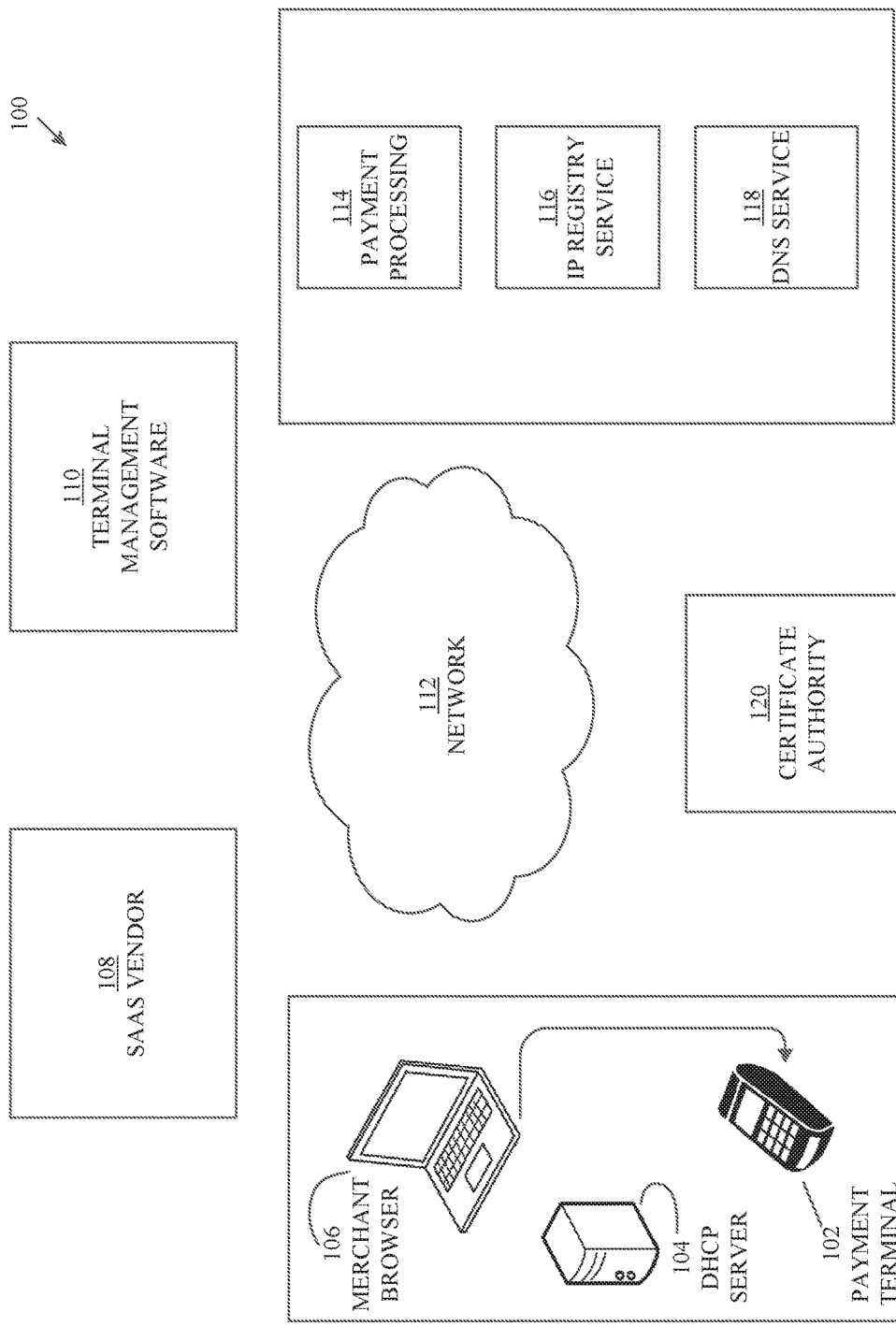
FIG. 1G: EXEMPLARY SYSTEM ENVIRONMENT

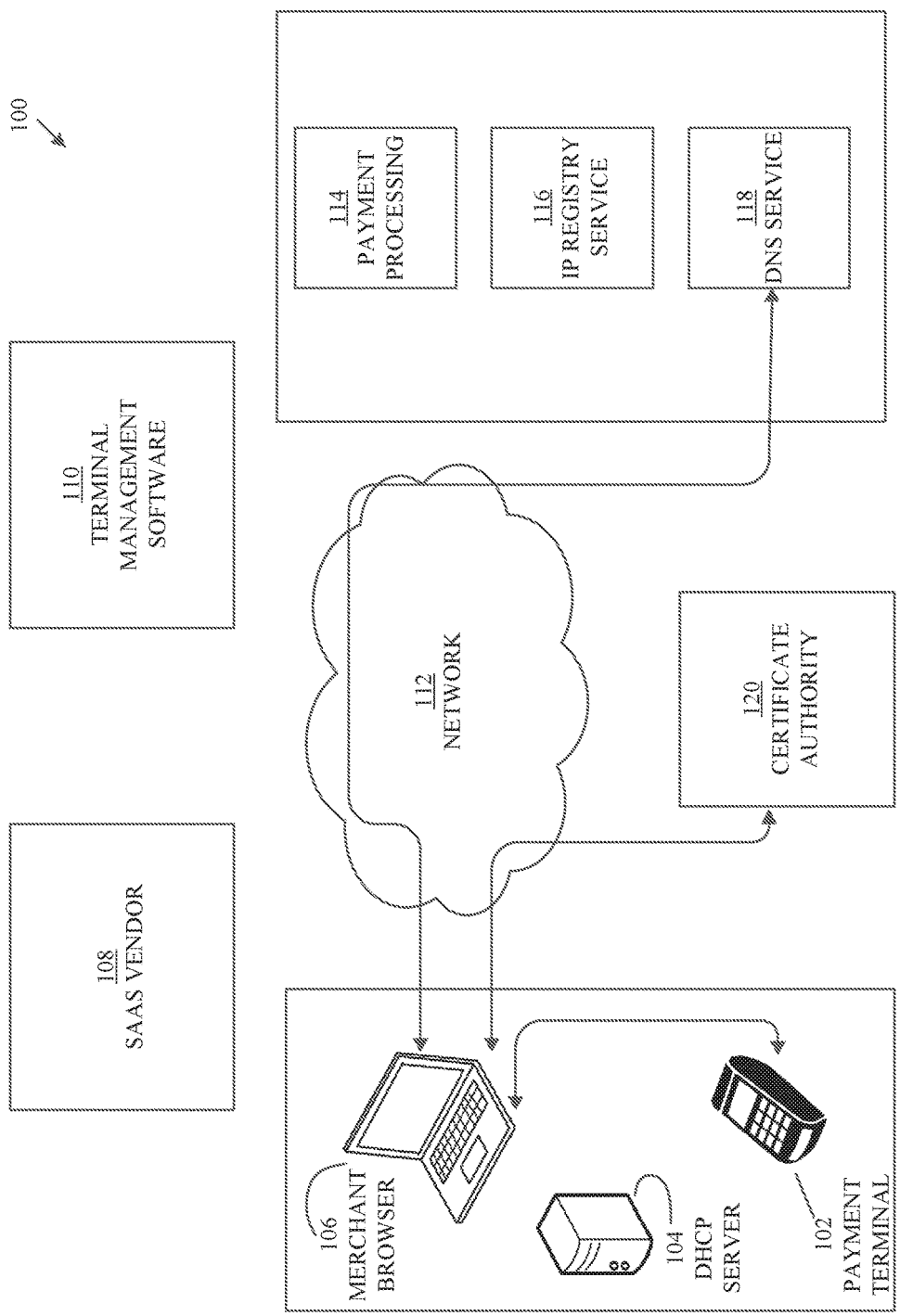
FIG. 1H: EXEMPLARY SYSTEM ENVIRONMENT

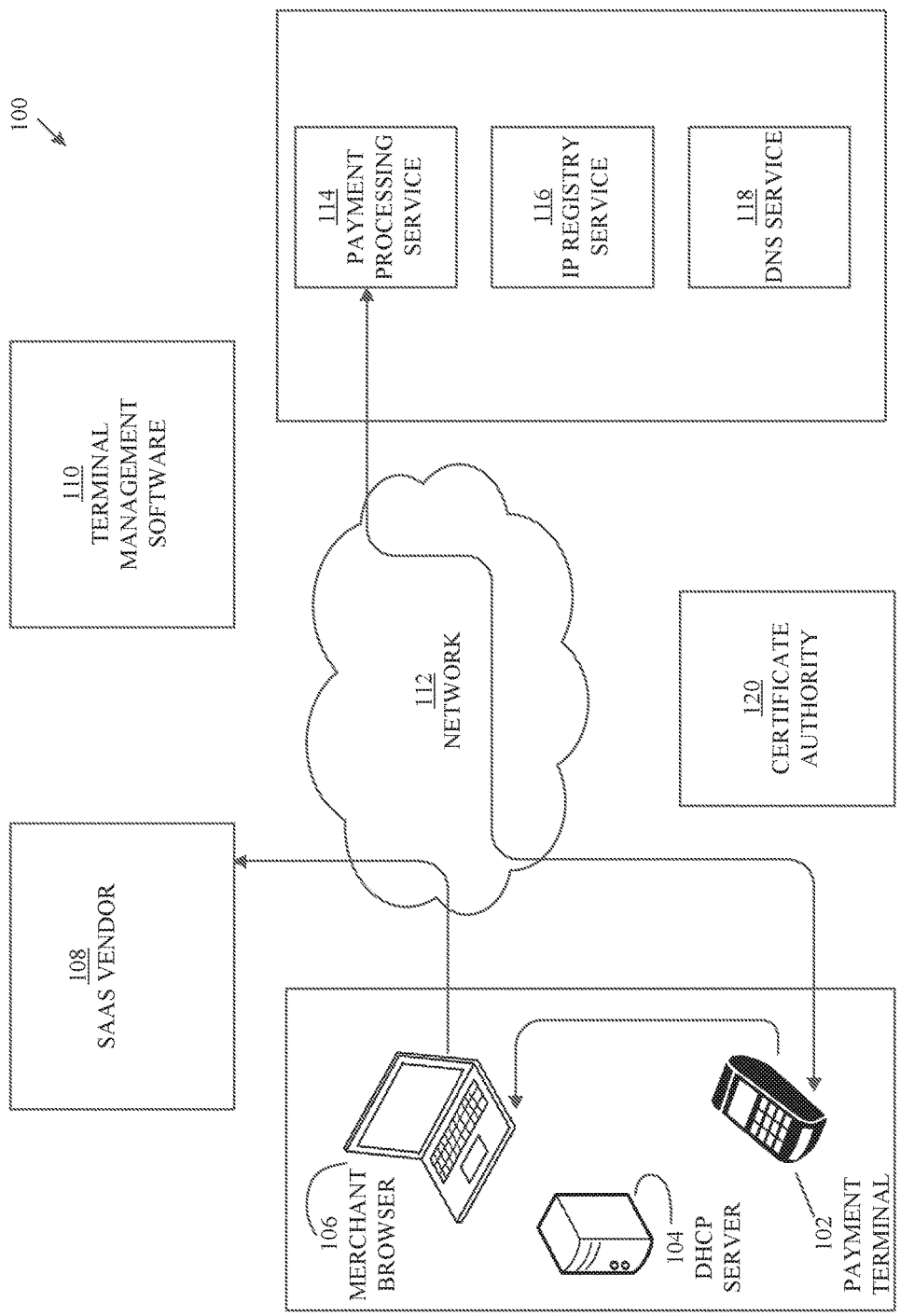
FIG. 1I: EXEMPLARY SYSTEM ENVIRONMENT

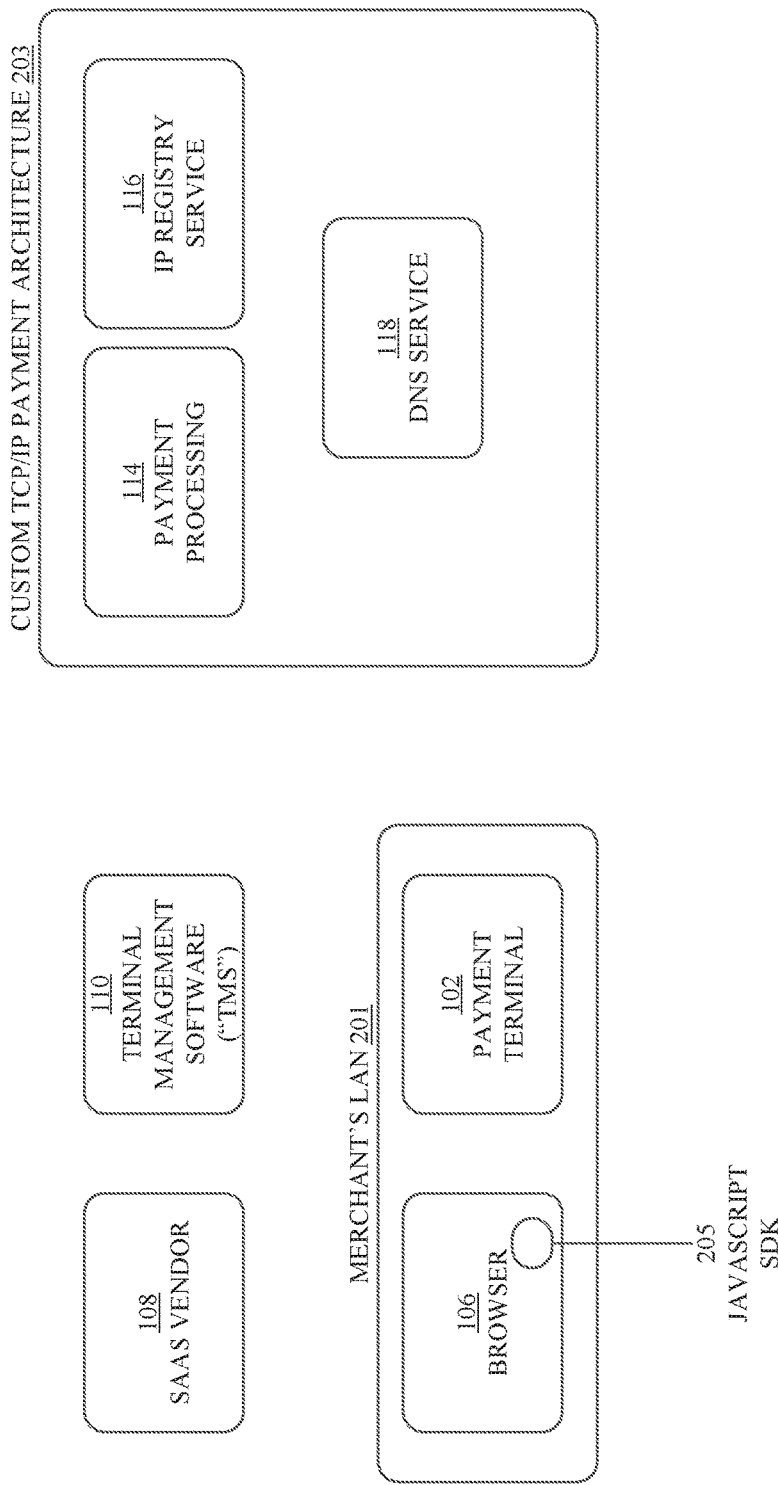
FIG. 2: EXEMPLARY SYSTEM COMPONENT DIAGRAM

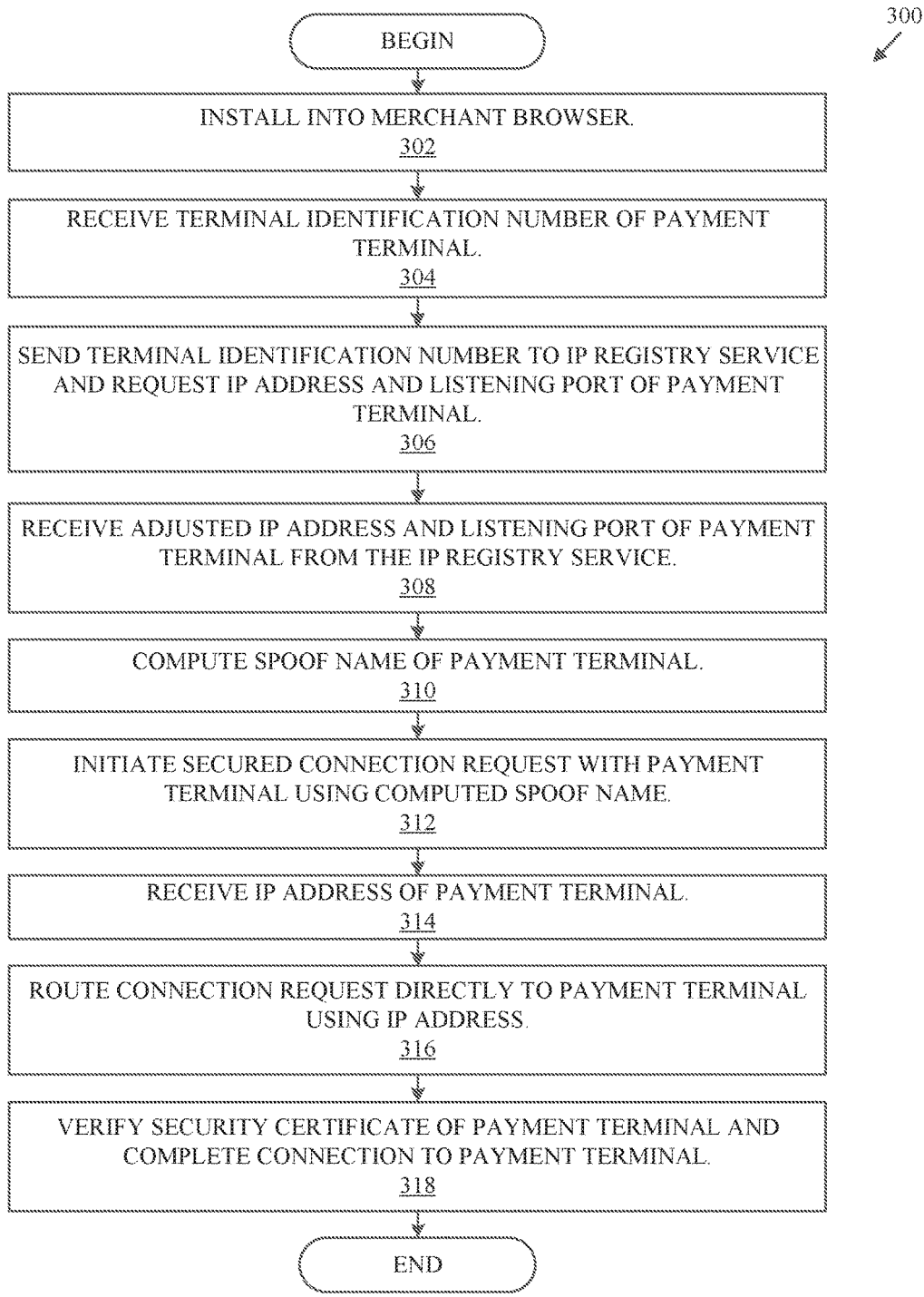
FIG. 3: EXEMPLARY JAVASCRIPT SDK PROCESS

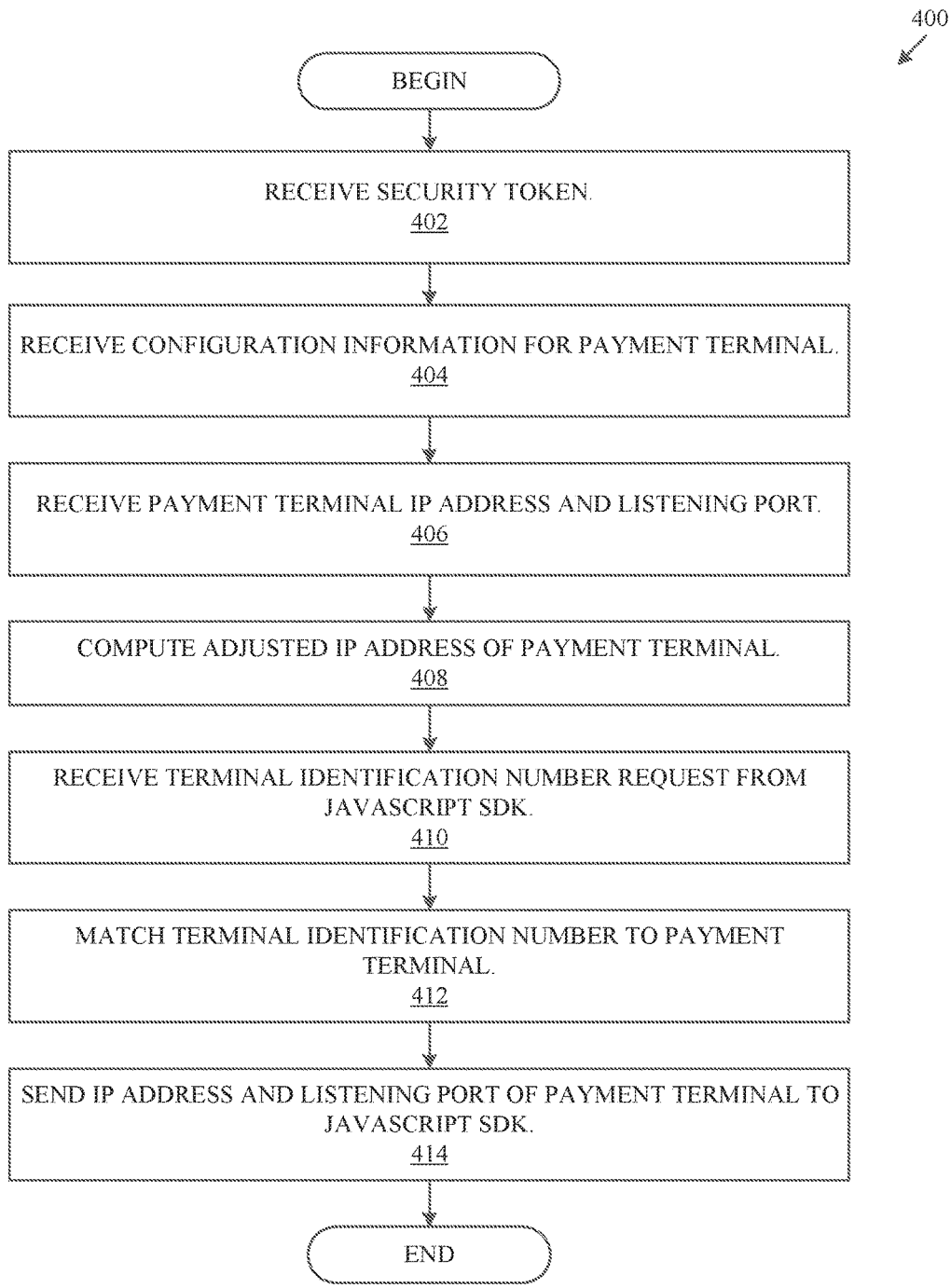
FIG. 4: EXEMPLARY IP REGISTRY PROCESS

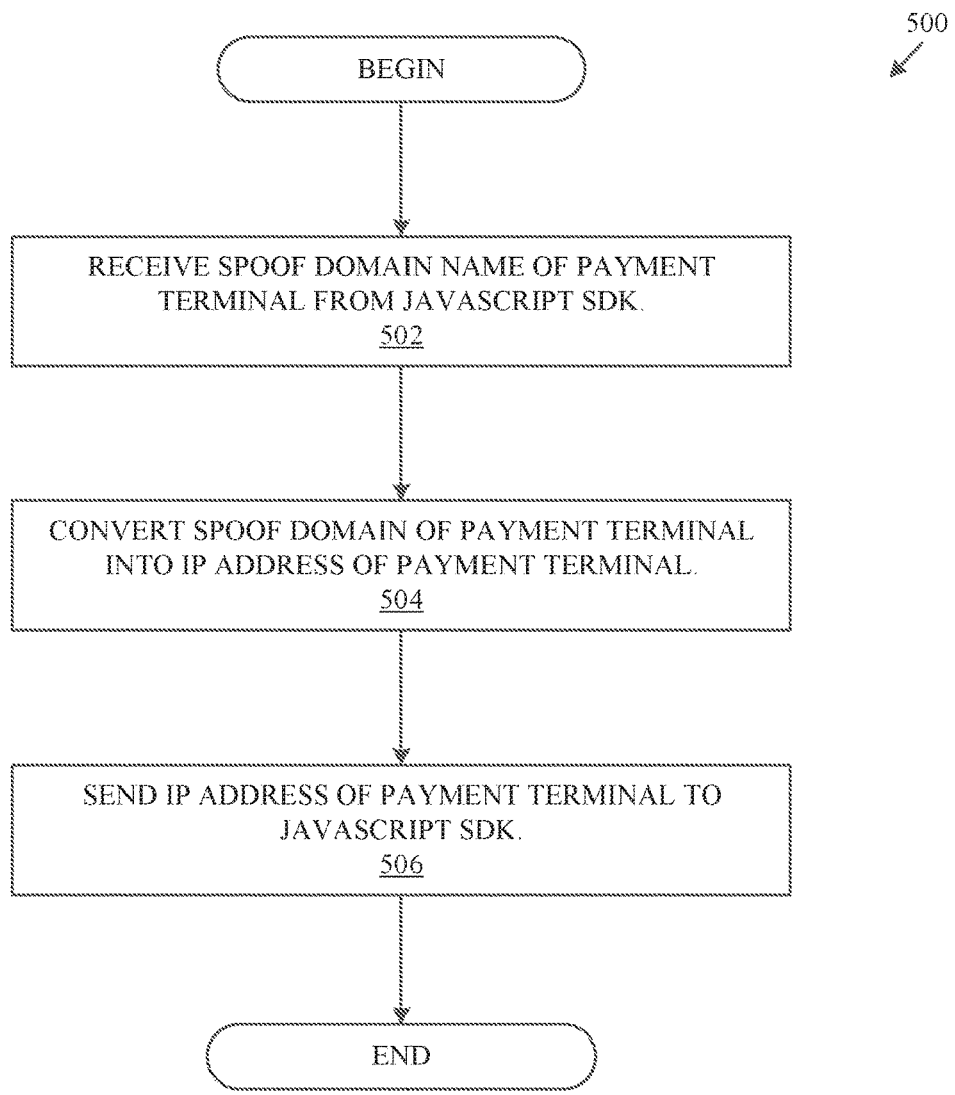
FIG. 5: EXEMPLARY CUSTOM DNS SERVICE PROCESS

SYSTEMS AND METHODS FOR MANAGING A PAYMENT TERMINAL VIA A WEB BROWSER

CROSS REFERENCE TO RELATED APPLICATIONS

This application claims priority to, the benefit under 35 U.S.C. § 119 of, and incorporates by reference herein in its entirety U.S. Provisional Patent Application No. 62/514,308, filed Jun. 2, 2017, and entitled "SAASCONEX."

TECHNICAL FIELD

The present systems and methods relate generally to communication over TCP/IP protocol.

BACKGROUND

As computer technology continues to become more pervasive, businesses are all but required to implement computer software into some aspect of their operations. However, installing and managing software can be an expensive undertaking that requires an expertise that many businesses do not have, and do not desire to obtain. As a mechanism for servicing businesses in need of software, but have no desire to install or manage it, software as a service ("SaaS") was developed. SaaS is a software distribution model where a third-party provider hosts applications and makes them available to customers over the Internet through a web browser. SaaS may remove the need for businesses to install and manage applications on their own computers or in their own data centers.

Businesses that use electronic cash registers ("ECR") often use SaaS applications to interface with their ECRs. Additionally, businesses that use ECRs often accept check and credit card payments from customers by using an electronic payment terminal to process those types of payments. Data collection and other communication issues may occur when businesses use SaaS applications and ECRs to manage their payment terminals, because SaaS applications for ECRs, and the web browsers they employ, are typically not designed to communicate directly with payment terminals. In such situations, businesses are limited to either using a payment terminal specifically designed to work with an ECR's software, or face the inefficient and cumbersome task of gathering and reconciling data from multiple sources. Therefore, there is a long-felt but unresolved need for a system or method that can control, update, and communicate with payment terminals via a web browser.

BRIEF SUMMARY OF THE DISCLOSURE

As discussed above, SaaS systems typically operate in a browser-based environment. Further, some payment terminals may upload information to an ECR via a hard-wired universal serial bus ("USB") connection (e.g., at the end of the day, end of a shift, or the like). As will be understood by one of ordinary skill in the art, a traditional browser cannot communicate through USB connections (for security purposes). Thus, any SaaS system operating in a browser-based environment normally cannot communicate with an ECR via a typical USB connection.

Some payment terminals include the ability to communicate with an ECR wirelessly. In these scenarios, the ECR may be programmed to communicate with the payment terminals over Wi-Fi or the like, eliminating the need for USB connections for uploading data to a SaaS system. However, for enhanced security, some systems include dynamically updated IP addresses for ECRs and/or payment terminals. For an ECR browser to communicate with a payment terminal with a dynamically-updated IP address, a user would need to re-configure the connection between the ECR and the payment terminal each time the payment terminal's IP address is updated (which may be periodically, and, in some embodiments, daily). Re-configuring the connection between the ECR and the payment terminal presents additional issues when a system includes multiple payment terminals (e.g., 2, 5, 20, 100, etc.).

Accordingly, and in various embodiments, the present systems and methods allows for continuous, secured connectivity of a payment terminal to an ECR loaded with a SaaS system via TCP/IP protocol, despite the payment terminal having a dynamically updated IP address.

Briefly described, and according to one embodiment, aspects of the present disclosure generally relate to systems and methods for controlling, updating, and communicating with payment terminals via a web browser over TCP/IP protocol. The systems and methods herein further relate to automatically updating a computing system communicating with a payment terminal over TCP/IP protocol with the payment terminal's IP address through an IP registry service (e.g., when the payment terminal's IP address is dynamically updated, the computing system will automatically be updated with the new IP address). The systems and methods herein still further relate to overcoming potential secure socket layer ("SSL") security issues between web browser and payment terminal communication over TCP/IP protocol. As will be understood from discussions herein, various combinations of the payment terminal, the web browser, the IP registry service, and a custom domain name system ("DNS") perform the functions described herein.

These and other aspects, features, and benefits of the claimed system(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 (including FIGS. 1A-1I) illustrates an exemplary system environment, according to one embodiment of the present disclosure.

FIG. 2 is an exemplary component diagram of the system environment, according to one embodiment of the present disclosure.

FIG. 3 is an exemplary flowchart of an exemplary JavaScript SDK process, according to one embodiment of the present disclosure.

FIG. 4 is an exemplary flowchart of an exemplary IP registry process, according to one embodiment of the present disclosure.

FIG. 5 is an exemplary flowchart of an exemplary custom DNS service process, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

The systems and methods disclosed herein relate to controlling, updating, and communicating with browser-enabled payment terminals via a web browser over TCP/IP protocol. The systems and methods herein further relate to automatically updating a computing system communicating with a payment terminal over TCP/IP protocol with the payment terminal's IP address through an IP registry service (e.g., when the payment terminal's IP address is dynamically updated, the computing system will automatically be updated with the new IP address). The systems and methods herein still further relate to overcoming potential SSL security issues between web browser and payment terminal communication over TCP/IP protocol. For purposes of this discussion, TCP/IP protocol refers to the suite of communication protocols used to interconnect network devices over both the internet and private networks.

In one embodiment, the system includes a payment terminal that supports communication over a network, for example, a PAX® Technology Limited terminal (although any terminal that supports communication over a network is contemplated as part of this system). According to particular embodiments, the system includes a payment terminal that exposes an HTTPS API or is otherwise configured to communicate over HTTPS protocol. In particular embodiments, the system includes a payment terminal that is configured to communicate via one or more other network protocols.

In some embodiments, the systems described herein include a browser plug-in or other software executable by a browser to be included in a merchant browser for communicating with the payment terminal that supports communication over a network, and other components of the system. In various embodiments, the merchant browser is configured for communicating with an IP registry service and a custom DNS. As will be understood from discussions herein, various combinations of the payment terminal, the merchant browser, a browser plug-in (e.g., JavaScript SDK), the IP registry service, and the custom DNS perform the functions described herein.

As discussed herein, in various embodiments, the system assigns a payment terminal a domain name based at least in part on the payment terminal's IP address and a root domain name. To overcome potential SSL security issues, in some embodiments, the systems discussed herein ensure that the payment terminal domain name matches a root domain name assigned to the SSL certificate (which is a prerequisite for establishing a secure connection via SSL). In one embodiment, the browser plug-in is enabled to use an IP address assigned to the payment terminal and designate a temporary, or "spoof" name, i.e., web address, for the payment terminal that includes the IP address and the root domain name assigned to the SSL certificate, thus linking the web address of the payment terminal with the SSL certificate of the payment terminal.

In various embodiments, upon a secured connection request by the merchant browser to the payment terminal via the spoof domain name, or web address of the payment terminal, the merchant browser is routed to the custom DNS service, such that the custom DNS service may translate the web address into the IP address of the payment terminal, allowing the merchant browser to initiate a secured connection to the payment terminal. Once a secured connection is initiated, the payment terminal presents the merchant browser with a copy of its SSL certificate, such that the merchant browser may authenticate the SSL certificate via a certificate authority, and verify the identity of the payment terminal (e.g., because the root domain name matches the domain name on the SSL certificate, the SSL certificate can be authenticated by the certificate authority). The secured connection is completed once the certificate authority authenticates or verifies the authenticity of the payment terminal's SSL certificate.

As will also be understood, the system may execute various functionalities described herein via a single component or more than one component of the system. For example, as further discussed below, the system may be configured to compute a "spoof" domain name. The system, in one embodiment, computes the spoof domain name via a JavaScript SDK installed on a browser. In at least one embodiment, the system computes the spoof domain name via the IP registry service (or a combination of the JavaScript SDK and the IP registry service).

As another example, the system, in the embodiment shown in the figures, includes several different components, such as an IP registry service and a DNS server. In one or more embodiments, the IP registry service and DNS server may be one system or one server.

These components and processes will be described herein.

Exemplary Environment

Referring now to the figures, for the purposes of example and explanation of the processes and components of the disclosed systems and methods, reference is made to FIG. 1 (including FIGS. 1A-1I), which illustrates an exemplary, high-level system environment 100 of one embodiment of the systems and methods herein. As will be understood and appreciated, the exemplary, high-level system environment 100 shown in FIG. 1 represents one approach or embodiment of the present system, and other aspects are used according to various embodiments of the present system. Generally, FIGS. 1A-1I show different steps of facilitating communication between a payment terminal 102 and an electronic cash register ("ECR") employing a software as a service ("SaaS") payment solution within an exemplary environment 100. In particular, FIG. 1A-1I depict a particular embodiment in which a customer's payment is processed via a payment terminal using a merchant browser (e.g., ECR) that accesses software from a SaaS vendor.

As an example, and as shown in FIG. 1, the exemplary system environment includes a payment terminal 102 assigned a terminal identification number (e.g., 123555000) for accepting customer payments. In at least one embodiment, the terminal identification number is a fixed number for identifying the payment terminal 102. In particular embodiments, the payment terminal 102 may accept customer payments in the form of credit cards, debit cards, checks, or other electronic payment mechanisms. In various embodiments, a merchant may assign a domain name to the payment terminal 102 (e.g., paymentterminal.com). In at least one embodiment, a merchant may obtain wildcard secure socket layer ("SSL") certificates for the domain name. For purposes of this discussion, an SSL certificate authenticates the identity of the website or device to which it is assigned, and also facilitates an encrypted connection between devices to protect data being transmitted to and from the website or device it is assigned to. Additionally, a wildcard SSL certificate may attach to unlimited subdomains (e.g., *.paymentterminal.com). In particular embodiments, the exemplary system environment 100 includes a dynamic host configuration protocol ("DHCP") server 104 for assigning IP addresses to the payment terminal 102 (e.g., 192.168.1.100) and the merchant browser 106 (e.g., 192.168.1.101). In various embodiments, the exemplary system environment includes terminal management software ("TMS") 110 for interfacing with, and managing, the payment terminal 102.

Additionally, in some embodiments, the exemplary system environment 100 includes a merchant browser 106 and a SaaS vendor 108. In particular embodiments, the merchant browser 106 may operate on an ECR (e.g., a desktop computer, a tablet computer, a mobile device, or any other suitable ECR). In various embodiments, the SaaS vendor 108 provides software to facilitate use of the ECR. In at least one embodiment, the merchant browser 106 is configured to interface with the SaaS vendor 108.

In some embodiments, the exemplary system environment 100 includes a certificate authority 120 for providing secure communication between the merchant browser 106 and the payment terminal 102. For purposes of this discussion, a certificate authority 120 issues digital certificates, which are verifiable data files that contain credentials to help websites, people, and devices, represent their authentic online identity, as verified by the certificate authority 120.

In at least one embodiment, a user downloads and installs a JavaScript Software Development Kit ("SDK") 205 on the merchant browser 106, or otherwise interfaces with the merchant browser 106, such that the JavaScript SDK 205 facilitates communication between the SaaS software loaded on the merchant browser 106 and the payment terminal 102.

Continuing with FIG. 1, in various embodiments, the exemplary system environment 100 includes a payment processing service 114 for processing customer payments made via the payment terminal 102 (e.g., approve or deny charges to a customer credit card). In at least one embodiment, the payment processing service 114 may employ a point-to-point encryption management system as discussed in U.S. patent application Ser. No. 14/591,171, filed on Jan. 7, 2015, and entitled "SYSTEMS AND METHODS FACILITATING DECRYPTION OF PAYLOADS RECEIVED FROM ENCRYPTION DEVICES," and U.S. patent application Ser. No. 15/597,402, filed on May 17, 2017, and entitled "SYSTEMS AND METHODS FOR DECRYPTION AS A SERVICE VIA A HARDWARE SECURITY MODULE," incorporated herein by reference in their entireties.

In particular embodiments, the exemplary system environment 100 includes an IP registry service 116 for recording IP addresses and other information of various devices. In various embodiments, the IP registry service 116 may record payment terminal 102's terminal identification number and other identifying information (e.g., version number, MAC address, device type, serial number, etc.). In some embodiments, the IP registry service 116 may transmit IP addresses of payment terminals 102 to a merchant browser 106. In one or more embodiments, and as will be discussed herein, the IP registry service 116 may be responsible for creating a "spoof," or temporary domain name of the payment terminal 102. As will be understood from discussions herein, the IP registry service 116 may record terminal identification numbers and IP addresses of any number of payment terminals and/or devices.

In at least one embodiment, the exemplary system environment 100 includes a custom DNS service 118 for providing identification services based on device domain names. For purposes of this discussion, a DNS service provides a naming system for computers, services, or other devices or resources connected to a network. In one or more embodiments, a DNS service translates a domain name into an IP address needed for identifying a device or service. For example, the domain name assigned to the payment terminal 102 (paymentterminal.com), would translate into the IP address of the payment terminal 102 (e.g., 192.168.1.100), which was assigned by the DHCP server 104.

In at least one embodiment, the various components of this exemplary system environment 100 are operatively connected via one or more networks 112. In one embodiment, the network 112 may be, but is not limited to, the Internet, and may involve the usage of one or more services (e.g., a web-deployed service with client/service architecture, a corporate local area network ("LAN") or wide area network ("WAN"), a cellular data network, or through a cloud-based system). Moreover, as will be understood and appreciated by one having ordinary skill in the art, various networking components like routers, switches, hosts, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

Turning to FIG. 1B, in various embodiments, the payment terminal 102 and the merchant browser 106 are assigned IP addresses by the DHCP server 104. In particular embodiments, both the payment terminal 102 and the merchant browser 106 are operatively connected to the DHCP server 104. In one embodiment, the DHCP server 104 assigns a unique IP address to both the payment terminal 102 (e.g., 192.168.1.100) and the merchant browser 106 (e.g., 192.168.1.101) such that the payment terminal 102 and the merchant browser 106 can be identified on the network. In various embodiments, the DHCP server 104 assigns a unique IP address to both the payment terminal 102 and the merchant browser 106 dynamically, such that the IP address assigned is not static and may vary. In one or more embodiments, the merchant may assign a static IP address to the payment terminal 102.

As shown in FIG. 1C, according to one embodiment, payment terminal 102 operatively connects to the terminal management software ("TMS") 110. In particular embodiments, the payment terminal 102 may connect to the TMS 110 via a hardwired (e.g., Ethernet, USB, etc.) or wireless (e.g., Wi-Fi, Bluetooth, etc.) connection. In various embodiments, the payment terminal 102 connects to the TMS 110 at system startup, upon a change in network 112 status (e.g., a new merchant browser 106 added to network 112), or other triggering event (e.g., a TMS 110 data update). In at least one embodiment, the TMS 110 stores device specific information related to the payment terminal 102 (e.g., device type, version number, terminal identification number, MAC address, serial number, administration information, SSL certifications, etc.). In one embodiment, payment terminal 102 downloads device specific information from the TMS 110.

Turning now to FIG. 1D, the payment terminal 102 connects to the IP registry service 116 via the network 112. In particular embodiments, the payment terminal 102 uploads the local IP address (and, in some embodiments, listening port) obtained from the DHCP server 104 to the IP registry service 116. For example, the payment terminal 102 may upload 192.168.1.100 to the IP registry service 116.

In one or more embodiments, the IP registry service 116 may be configured to adjust the received IP address to a standard/normalized format. In one embodiment, if the received IP address is in IPv4 format, but does not include 12 integers, with a decimal placed after every third integer (e.g., the received IP address is "192.168.1.100"), the IP registry service 116 adjusts the received IP address by appending zeroes such that three integers (including placed zeros) are included between each decimal point. As will be understood, the system will append zeros between decimal points to the left of any existing integers (e.g., if a terminal IP address is "192.168.1.100," the system may add two zeros to the left of the third "1"). For example, an IP address of 192.168.1.100 would be adjusted to 192.168.001.100. The system, in particular embodiments, may then utilize this standardized IP address format (e.g., with 12 integers) for creating a "spoof" domain name.

According to various embodiments, and as shown in FIG. 1E, the merchant browser 106 connects to the SaaS vendor 108. In particular embodiments, the system accesses the SaaS software from the SaaS vendor 108 via the merchant browser 106 (e.g., ECR). Additionally, in some embodiments, the system is configured to download a JavaScript SDK 205 onto the merchant browser 106. In one embodiment, the JavaScript SDK 205 may be responsible for communicating with the ECR application programming interface ("API") endpoints of the payment terminal 102, such that the JavaScript SDK 205 serves as a bridge between the merchant browser 106 loaded with SaaS software from the SaaS vendor 108, and the payment terminal 102.

Now turning to FIG. 1F, in various embodiments, the merchant browser 106 connects to the IP registry service 116. In particular embodiments, the JavaScript SDK 205 sends the IP registry service 116 the terminal identification number of the payment terminal 102 (or any other suitable unique identifier, such as, for example, the payment terminal's serial number, assigned nickname, etc.) and requests the spoof domain name in return. In various embodiments, the IP registry service 116 computes the spoof domain name of the payment terminal 102 by combining the root of the domain name assigned to the payment terminal 102, with the adjusted IP address of the payment terminal 102 stripped of all decimal points (e.g., the IP registry service 116 may convert an IP address of 192.168.1.100 to 192.168.001.100 and combine the adjusted IP address with a root domain name of paymentterminal.com to 192168001100.paymentterminal.com), such that the spoof domain name matches the SSL certificate assigned to the payment terminal. As discussed above in relation to FIG. 1D, the IP registry service 116, in at least one embodiment, previously received the IP address, listening port, and terminal identification number of the payment terminal 102. As will be understood, the merchant browser 106 can now communicate with payment terminal 102 via TCP/IP protocol using the payment terminal 102 IP address and listening port and/or the spoof domain name.

In at least one embodiment, and as will be discussed herein, the JavaScript SDK 205 may be responsible for creating a spoof, or temporary domain name of the payment terminal 102. In these embodiments, the merchant browser 106 loads the terminal identification number (e.g., 123555000) of the payment terminal 102 onto the JavaScript SDK 205. In various embodiments, the terminal identification number of the payment terminal 102 was previously provided to the SaaS vendor 108 and/or merchant browser 106 when the merchant initially setup the payment terminal 102.

In one or more embodiments, upon sending the IP registry service 116 the terminal identification number of the payment terminal 102, the JavaScript SDK 205 receives the corresponding adjusted address of the payment terminal 102 in return. In these embodiments, the JavaScript SDK 205 computes the spoof domain name for the payment terminal 102 by combining the root of the domain name assigned to the payment terminal 102, with the adjusted IP address of the payment terminal 102 stripped of all decimal points (e.g., the JavaScript SDK 205 may convert an adjusted IP address of 192.168.001.100 and a root domain name of paymentterminal.com to 192168001100.paymentterminal.com), such that the spoof domain name matches the SSL certificate assigned to the payment terminal. As will be understood, in various embodiments, the JavaScript SDK may be configured to receive the IP address of the payment terminal (e.g., 192.168.1.100) and convert the IP address to an adjusted IP address by appending zeros between decimals to create a 12 integer IP address, with three integers between each decimal point (e.g., 192.168.001.100).

Additionally, in various embodiments, the spoof domain name may be created using Internet protocol version 6 ("IPv6") structure. For example, an IP address of 2001:db8:: ff00:42:8329, in particular embodiments, would first be converted to a 32 integer format by appending zeros between each colon, e.g., 2001:0db8:0000:0042:0000:8a2e: 0370:7334. Continuing with this example, the colons may then be removed from the expanded IPv6 representation, and the resulting spoof domain name would be 20010db80000004200008a2e03707334.paymentterminal.com.

Turning now to FIG. 1G, in various embodiments, the merchant browser 106 is operatively connected to the payment terminal 102, which includes the wildcard SSL certification for the domain name assigned to the payment terminal 102 (e.g., the merchant purchased an SSL certificate for all subdomains of paymentterminal.com and this SSL certificate was loaded onto the payment terminal 102 via the TMS 110 or other component). In one embodiment, the merchant browser 106 sends a connection request to the payment terminal 102 over Hyper Text Transfer Protocol Secure ("HTTPS") using the spoof domain name.

Referring now to FIG. 1H, in particular embodiments, the merchant browser 106 (e.g., the JavaScript SDK) receives the SSL certificate from the payment terminal 102 (e.g., in response to a request for secure HTTPS connection to the same) and verifies the SSL certificate received from the payment terminal 102 with the certificate authority 120 in order to complete the connection to the payment terminal 102. This process is discussed immediately below.

In various embodiments, and as shown in FIG. 1H, the merchant browser 106 is operatively connected to the custom DNS service 118, the certificate authority 120, and the payment terminal 102. In some embodiments, the merchant browser 106 queries the custom DNS service 118 with the spoof domain name of the payment terminal 102 created by the IP registry service 116 or the JavaScript SDK 205 as described in reference to FIG. 1F (e.g., 1921681100.paymentterminal.com). In at least one embodiment, the custom DNS service converts the spoof domain name (e.g., 1921681100.paymentterminal.com) back into the IP address of the payment terminal 102 (e.g., 192.168.1.100), and sends the IP address of the payment terminal 102 (e.g., 192.168.1.100) back to the merchant browser 106 in response. In these embodiments, the HTTPS connection request by the merchant browser 106 is routed directly to the payment terminal 102 via the IP address of the payment terminal 102 (e.g., 192.168.1.100).

In various embodiments, the payment terminal 102 responds to the HTTPS connection request by sending the merchant browser 106 a copy of the payment terminal's 102 SSL certification, which matches the domain name of the payment terminal 102 known to the merchant browser 106 (paymentterminal.com) such that a successful SSL "handshake" may occur between the payment terminal 102 and the merchant browser 106. In various embodiments, upon obtaining a successful SSL handshake with the payment terminal 102, the merchant browser 106 verifies the payment terminal's 102 SSL certificate with the certificate authority 120 prior to completing the connection. At this point, in one or more embodiments, the system is configured to process a payment transaction.

For example, and as shown in FIG. 1I, in various embodiments, the payment terminal 102 is operatively connected to the merchant browser 106 via secured TCP/IP (HTTPS), as well as the payment processing service 114. In particular embodiments, the merchant browser 106 is also operatively connected to the SaaS vendor 108. In this example, upon initiation of a payment transaction via the payment terminal, in some embodiments, the payment terminal 102 sends the payment transaction to the payment processing service 114. In at least one embodiment, the payment processing service 114 sends an approval or denial response back to the payment terminal 102. In these embodiments, the payment terminal 102 then sends a response to the merchant browser 106 via the JavaScript SDK 205, based on the response received from the payment processing service 114. In particular embodiments, the merchant browser 106 updates the SaaS vendor 108 with the response received from the payment processing service 114.

Exemplary Architecture

System Components

Turning now to FIG. 2, an exemplary component diagram of the system environment is shown, according to one embodiment of the present disclosure. In various embodiments as discussed above, the system includes a SaaS vendor 108 and terminal management software ("TMS") 110. In some embodiments, the system includes a custom TCP/IP payment architecture 203, which facilitates payment processing and communicating over TCP/IP, such that a payment terminal 102 may securely communicate with a merchant browser 106. In at least one embodiment, the custom TCP/IP payment architecture 203 includes a payment processing service 114, an IP registry service 116, and a DNS service 118. In various embodiments, one or more components of the custom TCP/IP payment architecture 203 may include processors, databases, servers, and other computational elements.

In particular embodiment, the system also includes a merchant's local area network ("LAN"), which facilitates an interconnected network of devices maintained by a merchant. In certain embodiments, the merchant's LAN 201 includes a payment terminal 102 and a merchant browser 106. In various embodiments, the merchant's LAN 201 may be connected to the custom TCP/IP payment architecture via a hardwired (e.g., Ethernet, USB, etc.) or wireless (e.g., Wi-Fi, Bluetooth, etc.) connection. In one or more embodiments, the merchant's LAN 201 may also be connected to the SaaS vendor 108 and/or the TMS 110 via a hardwired (e.g., Ethernet, USB, etc.) or wireless (e.g., Wi-Fi, Bluetooth, etc.) connection. In particular embodiments, one or more components of the merchant's LAN 203 may include processors, databases, servers, and other computational elements. In at least one embodiment, and as described above, the merchant browser 106 includes a JavaScript SDK 205.

According to various embodiments, the JavaScript SDK 205 may be responsible for communicating with the ECR API endpoints of the payment terminal 102 and computing the spoof domain name of the payment terminal 102. In one embodiment, the JavaScript SDK 205 includes a self-sufficient library such that all functions and objects are contained within the JavaScript SDK 205. In particular embodiments, the JavaScript SDK 205 supports fluent function calls, such that functions may return an object that can have success and failure callbacks attached to it. In at least one embodiment, the JavaScript SDK 205 may support multiple payment terminals 102 on the same HTML page. In various embodiments, the JavaScript SDK 205 may work with any suitable web browser (e.g., Google Chrome®, Internet Explorer®, Microsoft Edge®, Firefox®, Safari®, etc.). In some embodiments, the functionality of the JavaScript SDK may be executed/completed by a standalone application (e.g., a standalone application interfacing with a merchant browser and an IP registry service and/or DNS server). In further embodiments, the functionality of the JavaScript SDK may be execute/completed in one or more run-time environments, such as, for example Node.js.

Servers/Computing Systems

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Exemplary Processes

Exemplary JavaScript SDK Process

FIG. 3 illustrates an exemplary flowchart of an exemplary JavaScript SDK (e.g., JavaScript SDK 205) process 300, according to one embodiment of the present disclosure. As will be understood by a person having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown. As will be understood from discussions herein, the steps shown in FIG. 3 may be performed by the JavaScript SDK, the merchant browser (e.g., in conjunction with the JavaScript SDK) and/or other components of the system.

In one embodiment, and as shown in FIG. 3, the exemplary process begins with step 302, in which the JavaScript SDK is installed on a merchant browser. In various embodiments, the merchant browser may be included or running on an electronic cash register ("ECR"), which may be a desktop computer, tablet computer, mobile device, or other like computational device.

At step 304, the JavaScript SDK receives a unique identifier, such as a terminal identification number of a payment terminal from the merchant browser or other system component. In one embodiment, the system is configured to retrieve the unique identifier from the SaaS vendor. In various embodiments, the unique identifier of the payment terminal may be stored on the ECR and accessible via the merchant browser. In particular embodiments, the unique identifier of the payment terminal may be stored in a remote database.

Turning now to step 306, the JavaScript SDK sends the unique identifier of the payment terminal to an IP registry service and requests the IP address and listening port of the payment terminal from the IP registry service in return. At step 308, the system receives the adjusted IP address and listening port of the payment terminal from the IP registry service.

At step 310, the JavaScript SDK is configured to compute a spoof domain name of the payment terminal, such that the domain name of the payment terminal matches a domain name of a SSL certificate assigned to the payment terminal. In one embodiment, after receiving the adjusted IP address and listening port of the payment terminal, the system may compute the spoof domain name of the payment terminal by combining the root of the domain name assigned to the payment terminal, with the adjusted IP address of the payment terminal stripped of all decimal points (e.g., an IP address of 192.168.1.100 and a root domain name of paymentterminal.com, may be converted to 192168001100.paymentterminal.com). In particular embodiments, the system may compute the spoof domain name of the payment terminal by using any suitable combination of alphanumeric characters.

At step 312, the JavaScript SDK initiates a secured connection request with the payment terminal using the spoof domain name computed above in step 310. In various embodiments, the secured connection request is initiated over TCP/IP protocol. In at least one embodiment, the secured connection request is an HTTPS request. As will be understood, the secured connection request initiated in step 312 will be routed to the domain registry company (e.g., GoDaddy.com®) of the root domain name (e.g. paymentterminal.com). In various embodiments, the domain registry company will then route the request to the custom DNS service based on the merchant having previously created an A name server record that points to the custom DNS service, as will be further described herein. For the purposes of this discussion, an A name server record is used to delegate a subdomain to a set of name servers, which specialize in mapping domain names to their respective IP addresses. Thus, in this example, any web address containing the root domain "paymentterminal.com" is routed to the custom DNS service, such that the IP address corresponding to the web address may be retrieved.

At step 314, the JavaScript SDK receives the IP address of the payment terminal from the custom DNS service (e.g., the custom DNS service receives 192168001100.paymentterminal.com and returns 192.168.1.100). In one embodiment, the system is configured to store the IP address of the payment terminal in a temporary memory location (e.g. cache).

At step 316, the JavaScript SDK is configured to route the secured connection request initiated in step 312, directly to the payment terminal using the IP address of the payment terminal.

In various embodiments, at step 318, the merchant browser, (in some embodiments, via the JavaScript SDK), verifies the security certificate of the payment terminal by matching the domain name of the payment terminal with the domain name assigned to an SSL certificate. In particular embodiments, if the domain name of the payment terminal matches the domain name assigned to the SSL certificate, then a secure SSL "handshake" occurs, and an encrypted channel of communication is opened between the merchant browser and the payment terminal. In various embodiments, upon obtaining a secure SSL handshake, the system verifies the security certificate of the payment terminal using a preauthorized authority, which checks the SSL certificate as presented and validates its authenticity.

Exemplary IP Registry Process

FIG. 4 illustrates an exemplary flowchart of an exemplary IP registry process 400, according to one embodiment of the present disclosure. In various embodiments, the exemplary process begins with step 402, in which the IP registry service receives a security token. For purposes of this discussion, a security token is a software construct that generates a single-use login key. In various embodiments, the security token may be operable to allow access to the payment terminal, such that the system may communicate with the payment terminal. In particular embodiments, the security token may be received from the payment terminal, the merchant browser, or any other operatively connected component of the system.

At step 404, the IP registry is configured to receive configuration information for the payment terminal. In one or more embodiments, the system may receive the configuration information from the merchant. In various embodiments, the system may receive the configuration information from the payment terminal, the terminal management software, the merchant browser, on any other component. In particular embodiments, configuration information may include a terminal identification number, serial number, other unique identifier, MAC address, version number, device type, and other like information. In one or more embodiments, the configuration information may be stored in a local database and/or a remote database.

At step 406, the IP registry receives the IP address and listening port of the payment terminal from the payment terminal, such that the IP address and listening port may be stored with, or otherwise matched to the registration information of the payment terminal. In one or more embodiments, the system receives the IP address and listening port from the payment terminal. In one embodiment, the system receives the IP address from the payment terminal after authenticating with the security token obtained in step 402. In particular embodiments, the system may receive the IP address and listening port from the TMS, the merchant browser, or any other suitable component. In one embodiment, the IP address and listening port may be stored in a local database. In another embodiment, the IP address and listening port may be stored in a remote database.

At step 408 the IP registry service is configured to compute an adjusted IP address of the payment terminal based on the IP address of the payment terminal received at step 406. In one or more embodiments, if the IP address received at step 406 does not include 12 integers, such that three integers are included in each part before and after each decimal point in the IP address, the IP registry service adjusts the received IP address. In various embodiments, the IP registry service is configured to adjust the received IP address by appending zeroes from left to right in each part that does not contain three integers, until three integers are included in each part (e.g., an IP address of 192.168.1.100 would be adjusted to 192.168.001.100).

At step 410, the IP registry is configured to receive a terminal identification number (or other unique identifier) of a payment terminal from a JavaScript SDK and/or a merchant browser. In various embodiments, at step 412, the IP registry is configured to match the received terminal identification number, to the payment terminal associated with the terminal identification number received. In particular embodiments, the terminal identification number is stored in a table with the IP address, MAC address, and listening port of the corresponding payment terminal. In one or more embodiments, the system may perform a database query, or other suitable search method, to identify the IP address and listening port associated with the received terminal identification number.

In response to receiving the terminal identification number at step 410, and upon locating the associated IP address and listening port at step 412, in various embodiments, at step 414, the IP registry sends the adjusted IP address computed at step 408, and the listening port of the payment terminal back to the JavaScript SDK and/or merchant browser.

Exemplary Custom DNS Service Process

Turning now to FIG. 5, an exemplary custom DNS service process 500 is shown, according to one embodiment of the present disclosure. As will be understood, a secured connection request initiated using a spoof domain name (e.g., 192168001100.paymentterminal.com) will be routed to the domain registry company (e.g., GoDaddy.com®) of the root domain name (e.g. paymentterminal.com). In particular embodiments, the domain registry company will then route the request to the custom DNS service based on the merchant having previously created an A name server record that points to the custom DNS service, such that the custom DNS service may determine where to route the spoof domain name. In one or more embodiments, the name server hosted by the system calculates the IP address of the payment terminal based on the spoof domain name.

In various embodiments, the exemplary process begins at step 502, where the DNS service is configured to receive a spoof domain name of the payment terminal from the JavaScript SDK. In various embodiments, the spoof domain name may contain letters, numbers, or symbols. In certain embodiments, the spoof domain name may include a pattern that resembles the IP address of the payment terminal.

At step 504, the DNS service converts the spoof domain name of the payment terminal into the IP address of the payment terminal, based on the name server of the system, which maps the payment terminal's domain name back to the IP address of the payment terminal as described above. As discussed herein, the IP address of the payment terminal may be included in the spoof domain name. For example, the IP address may be xxx and the spoof domain name may be xxx.yyy.com. Continuing with this example, the system converts the spoof domain name (e.g., xxx.yyy.com) to the IP address (e.g., xxx) by removing the root domain name (e.g., yyy.com). In particular embodiments, the system may add punctuation (e.g., decimals, periods, colons, semi-colons, etc.) at particular intervals, such as after every third or fourth integer.

At step 508 the DNS service is configured to send the IP address of the payment terminal back to the JavaScript SDK.

The DNS service process 500, in various embodiments, provides a mechanism that allows a merchant browser to locate a payment terminal via the spoof domain name assigned to the payment terminal. In particular embodiments, the DNS service process 500 facilitates a secured TCP/IP connection between the merchant browser running SaaS vendor software, and the payment terminal via a spoof domain name that matches the SSL certificate of the payment terminal and still maps back to the payment terminal.

In one or more embodiments, the DNS service calculates the IP address of the payment terminal as discussed above (e.g., the DNS service does not look up the IP address in any databases or the like). In at least one embodiment, the DNS service functionality is combined with the IP registry service described herein. As will be understood, in embodiments where the DNS service and IP registry service functionalities are combined, the system may be able to look up a payment terminal's IP address based on any pre-configured value added to a domain name (e.g., because the preconfigured value and the IP address are stored in a database as part of the IP registry service). In these embodiments, a spoof domain name for a payment terminal could include any suitable values attached to a domain name (e.g., unique identifier+domain name) and the system could return the IP address of a payment terminal upon receiving the spoof domain name by looking up the corresponding IP address of the payment terminal.

Alternate Embodiments

Alternative embodiments of the system may comprise features that are, in some respects, similar to the various components described above. Selected distinguishing features of these alternative embodiments are discussed below.

Additional Applications

In addition to SaaS applications for electronic cash registers, this disclosure contemplates other SaaS applications that may require a secured connection to otherwise incompatible hardware devices, including but not limited to: customer relationship management applications, file and data sharing applications, financial management applications, messaging applications, and other like software applications.

Additionally, in one or more embodiments, the system may include a software component and/or middleware, e.g., software that acts as a bridge between an operating system or database and applications. In these embodiments, the software component and/or middleware may communicate with the systems described herein (e.g., IP registry service and/or DNS service) to create secure connections over TCP/IP protocol with various devices, including, but not limited to payment terminals and other Internet of Things ("IoT") devices. Examples of middleware include, but are not limited to: transaction processing monitors, remote call procedures, message queues, automated backup systems, etc.

Additional Hardware Components

This disclosure is not limited to payment terminals. Other hardware components or devices that may use dynamic IP addresses, and require secured connection over TCP/IP protocol to otherwise incompatible SaaS applications are contemplated, including but not limited to: barcode scanners, smartphones and other smart devices, tablet computers, desktop computers, wearable devices, data acquisition devices, servers on internal networks, and any other browser-enabled and/or Internet of Things ("IoT") devices. As will be understood, the system may function with any devices that are network connected, and, in particular embodiments, expose an HTTPS API.

Furthermore, this disclosure contemplates device discovery and secured connectivity between multiple browser-enabled and/or IoT devices. In these embodiments, the IP registry service and the DNS service may be installed on a local network to facilitate such device-to-device connectivity.

Additional Aspects

Various aspects of the present systems and methods will now be described. It will be understood by one of ordinary skill in the art that any of the aspects below may incorporate and include any other aspects mentioned below or features described herein. Therefore, the aspects below should be understood to include any combination of aspects and should not be limited to the combinations presented below. For example, although the second aspect includes the IP registry service of the first aspect, it may also include features of the sixteenth aspect, the first aspect, or the forty-second aspect.

According to a first aspect, the present systems and methods, in various embodiments, may include a TCP/IP architecture for enabling secure communication between a payment terminal and a merchant computing system, the TCP/IP architecture including: A) an IP registry service, including one or more processors, the IP registry service in operative communication with a payment terminal and a merchant browser via a network, wherein the IP registry service: 1) receives, from the payment terminal, an IP address, port, and unique identifier associated with the payment terminal; 2) receives, from the merchant browser, the unique identifier of the payment terminal; and 3) in response to receiving the unique identifier, transmits the IP address and port of the payment terminal to the merchant browser such that the merchant browser can communicate with the payment terminal over TCP/IP protocol via the IP address and the port; and B) a domain name system (DNS), wherein the DNS: 1) receives a DNS lookup request from the merchant browser for a web address including the IP address of the payment terminal and a root domain name; and 2) in response to receiving the DNS lookup request for the web address: i) translates the web address into the IP address of the payment terminal by removing the root domain name; and ii) transmits the IP address of the payment terminal to the merchant browser, such that the merchant browser can communicate with the payment terminal via HTTPS protocol.

According to a second aspect, the TCP/IP architecture or a method of the first aspect or any other aspect, wherein the DNS translates the web address into the IP address of the payment terminal by removing the root domain name and reformatting the IP address.

According to a third aspect, the TCP/IP architecture or a method of the second aspect, or any other aspect, wherein the DNS reformats the IP address by inserting decimals into the IP address.

According to a fourth aspect, the TCP/IP architecture or a method of the third aspect or any other aspect, wherein the web address includes the IP address in an adjusted format.

According to a fifth aspect, the TCP/IP architecture or a method of the fourth aspect or any other aspect, wherein the adjusted format of the IP address includes the IP address without any decimal points.

According to a sixth aspect, the TCP/IP architecture or a method of the fifth aspect or any other aspect, wherein the IP registry service creates the web address by combining the IP address of the payment terminal with the root domain name.

According to a seventh aspect, the TCP/IP architecture or a method of the sixth aspect or any other aspect, wherein the merchant browser requests verification of the authenticity of a security certificate associated with the payment terminal and the web address from a certificate authority.

According to an eighth aspect, the TCP/IP architecture or a method of the seventh aspect or any other aspect, wherein the merchant browser, upon receiving verification of the authenticity of the security certificate, communicates with the payment terminal via HTTPS protocol.

According to a ninth aspect, the TCP/IP architecture or a method of the eighth aspect or any other aspect, wherein the IP registry service and the DNS are operatively connected.

According to a tenth aspect, the TCP/IP architecture or a method of the ninth aspect or any other aspect, further including a payment processing system.

According to an eleventh aspect, the TCP/IP architecture or a method of the tenth aspect or any other aspect, wherein the payment processing system: A) receives an encrypted payment payload from the payment terminal; B) determines whether the encrypted payment payload has been compromised; and C) upon determining that the payment payload has not been compromised, facilitates decryption of the encrypted payment payload.

According to a twelfth aspect, the present systems and methods may include, in various embodiments, a computer-implemented method including: A) receiving, from a payment terminal, an IP address, port, and unique identifier associated with the payment terminal at an IP registry service; B) receiving, from a merchant browser, the unique identifier associated with the payment terminal at the IP registry service; C) in response to receiving the unique identifier, transmitting the IP address and port of the payment terminal to the merchant browser such that the merchant browser can communicate with the payment terminal over TCP/IP protocol via the IP address and the port; D) receiving, at a custom domain name system (DNS), a DNS lookup request from the merchant browser for a web address including the IP address of the payment terminal and a root domain name; and E) in response to receiving the DNS lookup request for the web address: 1) translating, at the DNS, the web address into the IP address of the payment terminal by removing the root domain name; and 2) transmitting, by the DNS, the IP address of the payment terminal to the merchant browser, such that the merchant browser can communicate with the payment terminal via HTTPS protocol.

According to a thirteenth aspect, the method or system of the twelfth aspect or any other aspect, wherein the DNS translates the web address into the IP address of the payment terminal by removing the root domain name and reformatting the IP address.

According to a fourteenth aspect, the method or system of the thirteenth aspect or any other aspect, wherein the DNS reformats the IP address by inserting decimals or colons into the IP address.

According to a fifteenth aspect, the method or system of the fourteenth aspect or any other aspect, wherein the web address includes the IP address in an adjusted format.

According to a sixteenth aspect, the method or system of the fifteenth aspect or any other aspect, wherein the adjusted format of the IP address includes the IP address without any decimal points or colons.

According to a seventeenth aspect, the method or system of the sixteenth aspect or any other aspect, wherein the IP registry service creates the web address by combining the IP address of the payment terminal with the root domain name.

According to a eighteenth aspect, the method or system of the seventeenth aspect or any other aspect, wherein the merchant browser requests verification of authenticity of a security certificate associated with the payment terminal and the web address from a certificate authority.

According to a nineteenth aspect, the method or system of the eighteenth aspect or any other aspect, wherein the merchant browser, upon receiving verification of the authenticity of the security certificate, communicates with the payment terminal via HTTPS protocol.

According to a twentieth aspect, the method or system of the nineteenth aspect or any other aspect, wherein the IP registry service and the DNS are operatively connected.

According to a twenty-first aspect, the present systems and methods may include, in various embodiments, a TCP/IP architecture for enabling secure communication between a HTTPS/TLS enabled device and a software component within a local network, the TCP/IP architecture including: A) an IP registry service, including one or more processors, the IP registry service in operative communication with a HTTPS/TLS enabled device and a software component via a network, wherein the IP registry service: 1) receives, from the HTTPS/TLS enabled device, an IP address, port, and unique identifier associated with the HTTPS/TLS enabled device; 2) receives, from the software component, the unique identifier of the HTTPS/TLS enabled device; and 3) in response to receiving the unique identifier, transmits the IP address and port of the HTTPS/TLS enabled device to the software component such that the software component can communicate with the HTTPS/TLS enabled device over TCP/IP protocol via the IP address and the port; and B) a domain name system (DNS), wherein the DNS: 1) receives a DNS lookup request from the software component for a web address including the IP address of the HTTPS/TLS enabled device and a root domain name; and 2) in response to receiving the DNS lookup request for the web address: i) translates the web address into the IP address of the HTTPS/TLS enabled device by removing the root domain name; and ii) transmits the IP address of the HTTPS/TLS enabled device to the software component, such that the software component can communicate with the HTTPS/TLS enabled device via HTTPS protocol.

According to a twenty-second aspect, the TCP/IP architecture or a method of the twenty-first aspect or any other aspect, wherein the software component is middleware in communication with the browser.

According to a twenty-third aspect, the TCP/IP architecture or a method of the twenty-first aspect or any other aspect, wherein the software component is a JavaScript SDK installed as a plug-in on the browser.

According to a twenty-fourth aspect, the TCP/IP architecture or a method of the twenty-first aspect or any other aspect, wherein the software component is third-party software for connecting with one or more IoT devices.

According to a twenty-fifth aspect, the present systems and methods may include, in various embodiments, a method including: A) receiving, from the HTTPS/TLS enabled device, an IP address, port, and unique identifier associated with the HTTPS/TLS enabled device; B) receiving, from a software component, the unique identifier of the HTTPS/TLS enabled device; and C) in response to receiving the unique identifier, transmitting the IP address and port of the HTTPS/TLS enabled device to the software component such that a browser can communicate with the HTTPS/TLS enabled device over TCP/IP protocol via the IP address and the port; D) receiving a DNS lookup request from a browser for a web address comprising the IP address of the HTTPS/TLS enabled device and a root domain name; and E) in response to receiving the DNS lookup request for the web address: 1) translating the web address into the IP address of the HTTPS/TLS enabled device by removing the root domain name; and 2) transmitting the IP address of the HTTPS/TLS enabled device to browser, such that the software component can communicate with the HTTPS/TLS enabled device via HTTPS protocol.

According to a twenty-sixth aspect, the method or system of the twenty-fifth aspect or any other aspect, wherein the software component is middleware in communication with the browser.

According to a twenty-seventh aspect, the method or system of the twenty-fifth aspect or any other aspect, wherein the software component is a JavaScript SDK installed as a plug-in on the browser.

According to a twenty-eighth aspect, the method or system of the twenty-fifth aspect or any other aspect, wherein the software component is third-party software for connecting with one or more IoT devices.

According to a twenty-ninth aspect, the present systems and methods may include, in various embodiments, a system including a computer server including an IP registry service, the IP registry service in operative communication with a browser-enabled payment terminal and a merchant browser, wherein the IP registry service is configured for: A) receiving, from the browser-enabled payment terminal, a local IP address, port, and serial number of the browser-enabled payment terminal; B) receiving, from the merchant browser, the serial number of the browser-enabled payment terminal; and C) in response to receiving the serial number, transmitting the IP address and port of the browser-enabled payment terminal to the merchant browser such that the merchant browser can communicate with the browser-enabled payment terminal over TCP/IP protocol via the IP address and the port.

According to a thirtieth aspect, the present systems and methods may include, in various embodiments, a server including: A) a domain name system (DNS) for: 1) receiving a DNS lookup request from a merchant browser for a web address including an IP address of a payment terminal, wherein the merchant browser translated the IP address of the payment terminal into the web address; and 2) in response to receiving the DNS lookup request for the web address: i) translating the web address into the IP address of the payment terminal; and ii) transmitting the IP address of the payment terminal to the merchant browser.

According to a thirty-first aspect, the present systems and methods may include, in various embodiments, a system including: A) a computer server including an IP registry service, the IP registry service in operative communication with a browser-enabled payment terminal and a merchant browser, wherein the IP registry service is configured for: 1) receiving, from the browser-enabled payment terminal, a local IP address, port, and serial number of the browser-enabled payment terminal; 2) receiving, from the merchant browser, the serial number of the browser-enabled payment terminal; and 3) in response to receiving the serial number, transmitting the IP address and port of the browser-enabled payment terminal to the merchant browser such that the merchant browser can communicate with the browser-enabled payment terminal over TCP/IP protocol via the IP address and the port; and B) a domain name system (DNS) for: 1) receiving a DNS lookup request from a merchant browser for a web address including an IP address of a payment terminal, wherein the merchant browser translated the IP address of the payment terminal into the web address; and 2) in response to receiving the DNS lookup request for the web address: i) translating the web address into the IP address of the payment terminal; and ii) transmitting the IP address of the payment terminal to the merchant browser.

According to a thirty-second aspect, the present systems and methods may include, in various embodiments, a system including an executable computer program operatively connected to a merchant browser and an IP registry service, a DNS service, and a payment terminal, wherein the executable computer program is configured for: A) receiving a unique identifier associated with a payment terminal; B) transmitting the unique identifier to an IP registry service; C) requesting the IP address and listening port of the payment terminal from the IP registry service; D) receiving the IP address and listening port of the payment terminal from the IP registry service; and E) upon receiving the IP address and listening port of the payment terminal from the IP registry service: 1) computing a spoof domain name of the payment terminal; 2) initiating a secured connection request to the payment terminal; 3) receiving the IP address of the payment terminal from a DNS Service; and 4) upon receiving the IP address of the payment terminal from the DNS Service: i) routing the secured connection request directly to the payment terminal; ii) verifying a security certificate of the payment terminal; and iii) connecting to the payment terminal.

According to a thirty-third aspect, the system or a method of the thirty-second aspect or any other aspect, wherein the merchant browser is an electronic cash register.

According to a thirty-fourth aspect, the system or a method of the thirty-third aspect or any other aspect, wherein the executable computer code is operatively connected to the payment terminal via a wireless radio.

According to a thirty-fifth aspect, the system or a method of the thirty-fourth aspect or any other aspect, wherein the wireless radio includes a Bluetooth device.

According to a thirty-sixth aspect, the system or a method of the thirty-fifth aspect or any other aspect, wherein the executable computer program is a JavaScript SDK installed as a plug-in to the merchant browser.

According to a thirty-seventh aspect, the system or a method of the thirty-fifth aspect or any other aspect, wherein the executable computer program is middleware communicably connected to the merchant browser, the IP registry service, the DNS service, and the payment terminal.

According to a thirty-eighth aspect, the system or a method of the thirty-seventh aspect or any other aspect, wherein the secured connection request to the payment terminal is initiated via transport layer security ("TLS") protocol.

According to a thirty-ninth aspect, the present systems and methods may include, in various embodiments, a method including: A) receiving a unique identifier associated with a payment terminal; B) transmitting the unique identifier to an IP registry service; C) requesting the IP address and listening port of the payment terminal from the IP registry service; D) receiving the IP address and listening port of the payment terminal from the IP registry service; and E) upon receiving the IP address and listening port of the payment terminal from the IP registry service: 1) computing a spoof domain name of the payment terminal; 2) initiating a secured connection request to the payment terminal; 3) receiving the IP address of the payment terminal from a DNS Service; and F) upon receiving the IP address of the payment terminal from the DNS Service: 1) routing the secured connection request directly to the payment terminal; 2) verifying a security certificate of the payment terminal; and 3) connecting to the payment terminal.

According to a fortieth aspect, the present systems and methods may include, in various embodiments, a system including an executable computer program operatively connected to a merchant browser and an IP registry service, a DNS service, and a payment terminal, wherein the executable computer program is configured for: A) receiving a unique identifier associated with a payment terminal; B) transmitting the unique identifier to the IP registry service; C) requesting the IP address and listening port of the payment terminal from the IP registry service; D) receiving the IP address, listening port, and spoof domain address of the payment terminal from the IP registry service; E) initiating a secured connection request to the payment terminal; F) receiving the IP address of the payment terminal from a DNS Service; and G) upon receiving the IP address of the payment terminal from the DNS Service: 1) routing the secured connection request directly to the payment terminal; 2) verifying a security certificate of the payment terminal; and 3) connecting to the payment terminal.

According to a forty-first aspect, the present systems and methods may include, in various embodiments, a system including an executable computer program operatively connected to a merchant browser and an IP registry service, a DNS service, and a payment terminal, wherein the executable computer program is configured for: A) receiving a unique identifier associated with a payment terminal; B) transmitting the unique identifier to an IP registry service; C) requesting the IP address and listening port of the payment terminal from the IP registry service; D) receiving the IP address, listening port, and spoof domain name of the payment terminal from the IP registry service; and E) upon receiving the IP address and listening port of the payment terminal from the IP registry service, transmitting the IP address, listening port, and spoof domain name of the payment terminal to a merchant browser such that the merchant browser can connect to the payment terminal via the IP address, listening port, and spoof domain name via HTTPS protocol.

According to a forty-second aspect, the present systems and methods may include, in various embodiments, a method including: A) receiving a unique identifier associated with a payment terminal; B) transmitting the unique identifier to an IP registry service; C) requesting the IP address and listening port of the payment terminal from the IP registry service; D) receiving the IP address, listening port, and spoof domain name of the payment terminal from the IP registry service; and E) upon receiving the IP address and listening port of the payment terminal from the IP registry service, transmitting the IP address, listening port, and spoof domain name of the payment terminal to a merchant browser such that the merchant browser can connect to the payment terminal via the IP address, listening port, and spoof domain name via HTTPS protocol.

Conclusion

Aspects, features, and benefits of the present disclosure will become apparent from the information disclosed herein. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates. Various brand names and devices produced by certain companies (e.g., PAX®) may be included in this application (including the exhibits). As will be understood, these devices are exemplary only and other devices with similar functionality are contemplated as part of the systems and methods disclosed herein.

The foregoing description of the exemplary embodiments has been presented only for the purposes of illustration and description and is not intended to be exhaustive or to limit the systems and methods to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from their spirit and scope. Accordingly, the scope of the present disclosure is defined by the appended claims rather than the foregoing description and the exemplary embodiments described therein.

What is claimed is:

1. A TCP/IP architecture for enabling secure communication, the TCP/IP architecture comprising:
   an IP registry service, including one or more processors, the IP registry service in operative communication with a HTTPS/TLS enabled device and a software component via a network, wherein the software component is associated with a browser running on a computing device and wherein the IP registry service:
      receives, from the HTTPS/TLS enabled device, an IP address, port, and unique identifier associated with the HTTPS/TLS enabled device;
      receives, from the software component, the unique identifier of the HTTPS/TLS enabled device; and
      in response to receiving the unique identifier, transmits the IP address and port of the HTTPS/TLS enabled device to the software component such that the browser running on the computing device can communicate with the HTTPS/TLS enabled device over TCP/IP protocol via the IP address and the port; and
   a domain name system (DNS), wherein the DNS:
      receives a DNS lookup request from the browser for a web address, the web address comprising the IP address of the HTTPS/TLS enabled device and a root domain name; and
      in response to receiving the DNS lookup request for the web address:
         translates the web address into the IP address of the HTTPS/TLS enabled device by removing the root domain name from the web address; and
         transmits the IP address of the HTTPS/TLS enabled device to the browser, such that the browser can communicate with the HTTPS/TLS enabled device via HTTPS protocol.

2. The TCP/IP architecture of claim 1, wherein the software component is middleware in communication with the browser.

3. The TCP/IP architecture of claim 1, wherein the software component is a JavaScript SDK installed as a plug-in on the browser.

4. The TCP/IP architecture of claim 1, wherein the software component is third-party software for connecting with one or more Internet of Things devices.

5. The TCP/IP architecture of claim 1, wherein the HTTPS/TLS enabled device is a payment terminal.

6. A method comprising:
   receiving, from a HTTPS/TLS enabled device, an IP address, port, and unique identifier associated with the HTTPS/TLS enabled device;
   receiving, from a software component, the unique identifier of the HTTPS/TLS enabled device, wherein the software component is associated with a browser running on a computing device; and
   in response to receiving the unique identifier, transmitting the IP address and port of the HTTPS/TLS enabled device to the software component such that the browser running on the computing device can communicate with the HTTPS/TLS enabled device over TCP/IP protocol via the IP address and the port;
   receiving a DNS lookup request from the browser for a web address, the web address comprising the IP address of the HTTPS/TLS enabled device and a root domain name; and
   in response to receiving the DNS lookup request for the web address:
      translating the web address into the IP address of the HTTPS/TLS enabled device by removing the root domain name from the web address; and
      transmitting the IP address of the HTTPS/TLS enabled device to the browser, such that the software component can communicate with the HTTPS/TLS enabled device via HTTPS protocol.

7. The method of claim 6, wherein the software component is middleware in communication with the browser.

8. The method of claim 6, wherein the software component is a JavaScript SDK installed as a plug-in on the browser.

9. The method of claim 6, wherein the software component is third-party software for connecting with one or more Internet of Things devices.

10. The method of claim 6, wherein the HTTPS/TLS enabled device is a payment terminal.

\* \* \* \* \*